United States Patent
Na et al.

(10) Patent No.: US 10,732,762 B2
(45) Date of Patent: Aug. 4, 2020

(54) ELECTRONIC DEVICE AND METHOD OF MANUFACTURING THE SAME

(71) Applicant: Samsung Display Co., Ltd., Yongin-si, Gyeonggi-do (KR)

(72) Inventors: Hyunjae Na, Seoul (KR); Jaseung Ku, Seoul (KR); Gyeongnam Bang, Seoul (KR); Sangwon Lee, Seoul (KR)

(73) Assignee: Samsung Display Co., Ltd. (KR)

( * ) Notice: Subject to any disclaimer, the term of this patent is extended or adjusted under 35 U.S.C. 154(b) by 57 days.

(21) Appl. No.: 15/985,379

(22) Filed: May 21, 2018

(65) Prior Publication Data
US 2019/0050104 A1   Feb. 14, 2019

(30) Foreign Application Priority Data
May 26, 2017 (KR) .......................... 10-2017-0065587

(51) Int. Cl.
| | | |
|---|---|---|
| *G06F 3/041* | (2006.01) | |
| *G06F 3/0354* | (2013.01) | |
| *G06F 3/0488* | (2013.01) | |
| *G06F 3/044* | (2006.01) | |

(52) U.S. Cl.
CPC ........ *G06F 3/0416* (2013.01); *G06F 3/03547* (2013.01); *G06F 3/044* (2013.01); *G06F 3/0488* (2013.01); *G06F 2203/04111* (2013.01); *G06F 2203/04112* (2013.01)

(58) Field of Classification Search
CPC combination set(s) only.
See application file for complete search history.

(56) References Cited

U.S. PATENT DOCUMENTS

| | | | | |
|---|---|---|---|---|
| 2012/0062469 A1* | 3/2012 | Guard | .................... | G06F 3/044 345/173 |
| 2014/0070350 A1* | 3/2014 | Kim | ..................... | G06F 3/0412 257/432 |
| 2014/0152910 A1* | 6/2014 | Kang | ..................... | G06F 1/1643 349/12 |
| 2014/0198268 A1* | 7/2014 | Sugita | .................... | G06F 3/044 349/12 |
| 2014/0211102 A1* | 7/2014 | Kang | ..................... | G06F 3/041 349/12 |

(Continued)

FOREIGN PATENT DOCUMENTS

| | | |
|---|---|---|
| KR | 10-1025023 B1 | 3/2011 |
| KR | 10-2016-0088994 A | 7/2016 |

*Primary Examiner* — Van N Chow
(74) *Attorney, Agent, or Firm* — Innovation Counsel LLP

(57) ABSTRACT

An electronic device includes a display member including a plurality of display elements and a sensing member including a first sensing pattern disposed on the display member and a second sensing pattern disposed on the display member and capacitively coupled to the first sensing pattern. Each of the first and second sensing patterns includes a plurality of mesh lines to define a plurality of openings. Each of the first and second sensing patterns includes a unit mesh pattern including a central opening and a plurality of peripheral openings surrounding the central opening. A plurality of cutting lines, each of which opens at least two adjacent openings of the plurality of peripheral openings to each other, are defined in the unit mesh pattern. The cutting lines are arranged in a direction surrounding the central opening.

15 Claims, 26 Drawing Sheets

(56) References Cited

U.S. PATENT DOCUMENTS

2015/0370375 A1* 12/2015 Hayashi .................. G06F 3/044
  345/174
2016/0085339 A1   3/2016 Yashiro et al.
2016/0209971 A1   7/2016 Kim et al.

* cited by examiner

ELECTRONIC DEVICE AND METHOD OF MANUFACTURING THE SAME

CROSS-REFERENCE TO RELATED APPLICATION

This application claims priority to and the benefits of Korean Patent Application No. 10-2017-0065587, filed on May 26, 2017 under 35 U.S.C. § 119, the disclosure of which is herein incorporated by reference in its entirety.

BACKGROUND

1. Field

Embodiments of the present disclosure relate to an electronic device and, more particularly, to an electronic device with improved visibility and a method of manufacturing the same.

2. Description of the Related Art

An electronic device is activated by an electrical signal applied thereto. An electronic device may include a display device that is configured to display an image or a touch screen that is configured to sense a touch provided from the outside.

An electronic device may include various electrode patterns to be activated by an electrical signal. An area in which electrode patterns are activated may display information or may respond by a touch provided from the outside.

SUMMARY

Embodiments of the present disclosure may provide an electronic device capable of preventing touch sensors from being viewed by reflection of external light.

Embodiments of the present disclosure may also provide a method of manufacturing an electronic device that is capable of forming a touch sensor with improved visibility.

In an aspect, an electronic device includes a display member including a plurality of display elements and divided into light emitting areas, in which the display elements are respectively disposed, and a peripheral area adjacent to the light emitting areas when viewed from a plan view, and a sensing member including a first sensing pattern disposed on the display member and a second sensing pattern disposed on the display member and capacitively coupled to the first sensing pattern. Each of the first and second sensing patterns includes a plurality of mesh lines disposed in the peripheral area to define a plurality of openings overlapping with the light emitting areas, respectively. Each of the first and second sensing patterns includes a unit mesh pattern including a central opening and a plurality of peripheral openings surrounding the central opening. The central opening and the peripheral openings are included in the plurality of openings. A plurality of cutting lines, each of which opens at least two adjacent openings of the plurality of peripheral openings to each other, are defined in the unit mesh pattern. The cutting lines are arranged in a direction surrounding the central opening.

Each of the cutting lines may be defined to connect centers of some of the peripheral openings, and portions of the mesh lines that overlap with the cutting lines may be cut to open the peripheral openings.

The peripheral openings may be arranged to surround the central opening in the unit mesh pattern, and the unit mesh pattern may have a shape corresponding to a shape of the opening.

The unit mesh pattern may include a central mesh pattern in which the central opening is defined, the central mesh pattern having a quadrilateral shape, and a sub-mesh pattern in which the peripheral openings are defined, the sub-mesh pattern having a frame shape surrounding the central mesh pattern. The cutting lines may be spaced apart from each other in the sub-mesh pattern and may be arranged in a clockwise direction or counterclockwise direction around the central mesh pattern.

The sub-mesh pattern may include first sub-mesh patterns that are respectively adjacent to four sides of the central mesh pattern, wherein first cutting lines are defined in the first sub-mesh patterns, and second sub-mesh patterns that are respectively adjacent to four vertexes of the central mesh pattern, wherein second cutting lines are defined in the second-sub-mesh patterns. In such an embodiment, i peripheral openings may be defined in each of the first sub-mesh patterns where 'i' is a natural number, and i×i peripheral openings may be defined in each of the second sub-mesh patterns.

Each of the first cutting lines may have a line shape that extends in a direction intersecting adjacent one of the four sides of the central mesh pattern.

Each of the second cutting lines may have a closed-loop shape.

Each of the second cutting lines may have an X-shape.

The sub-mesh pattern may include a first sub-mesh pattern that has a quadrilateral frame shape surrounding an edge of the central mesh pattern, wherein first cutting lines are defined in the first sub-mesh pattern, and a second sub-mesh pattern that has a quadrilateral frame shape surrounding the first sub-mesh pattern, wherein second cutting lines are defined in the second sub-mesh pattern. Each of the first cutting lines may have a straight line shape, and each of the first cutting lines may extend in parallel to adjacent one of four sides of the central mesh pattern.

The second cutting lines may have the same shapes as the first cutting lines, and each of the second cutting lines may extend in parallel to adjacent one of four sides of the first sub-mesh pattern.

Each of the second cutting lines may have a bent line shape, and the second cutting lines may be respectively adjacent to four vertexes of the first sub-mesh pattern and are arranged to surround the four vertexes.

A plurality of unit mesh patterns may be arranged. and outermost mesh lines of adjacent unit mesh patterns overlap with each other.

A plurality of unit mesh patterns may be arranged, and at least one of the cutting lines of one unit mesh pattern is connected to a corresponding one of the cutting lines of another unit mesh pattern that is adjacent to the one unit mesh pattern.

In another aspect, a method of manufacturing an electronic device includes providing an initial mesh substrate including first mesh lines extending in parallel to each other in a first direction and second mesh lines extending in parallel to each other in a second direction that intersects the first direction, the initial mesh substrate including a plurality of unit mesh patterns in which cutting lines that cut portions of the first and second mesh lines are defined, cutting the first and second mesh lines along a boundary line connecting at least some of the cutting lines to form a plurality of sensing patterns, and forming an insulating layer on the plurality of sensing patterns. The cutting lines include a line that extends in the first direction or the second direction and links centers of two openings adjacent to each other.

The unit mesh pattern may include a central mesh pattern in which a central opening is defined, and a sub-mesh pattern in which peripheral openings that surround the central opening are defined. The cutting lines may be defined in the sub-mesh pattern to open at least two of the peripheral openings to each other.

The cutting lines may be spaced apart from each other and may be arranged in a clockwise direction or counterclockwise direction around the central mesh pattern.

At least one of the cutting lines may have a cross shape that includes a first pattern extending in the first direction and a second pattern extending in the second direction and crossing over the first pattern. A crossing point of the first and second patterns may be a center of one of the peripheral openings.

At least one of the cutting lines may have a closed-loop shape.

The cutting of the first and second mesh lines along the boundary line may include cutting the mesh lines disposed between the at least some of the cutting lines, and each of the at least some of the cutting lines may entirely overlap with the boundary line.

The method may further include forming a bridge pattern connecting some of the plurality of sensing patterns on the insulating layer. The forming of the insulating layer may include forming an insulating layer covering the plurality of sensing patterns, and forming a contact hole in the insulating layer.

BRIEF DESCRIPTION OF THE DRAWINGS

The above and other aspects and features of the present disclosure will become more apparent by describing in further detail exemplary embodiments thereof with reference to the accompanying drawings, in which.

DETAILED DESCRIPTION OF THE EMBODIMENTS

Hereinafter, embodiments of the present disclosure will be described in detail with reference to the accompanying drawings.

Figure 1:
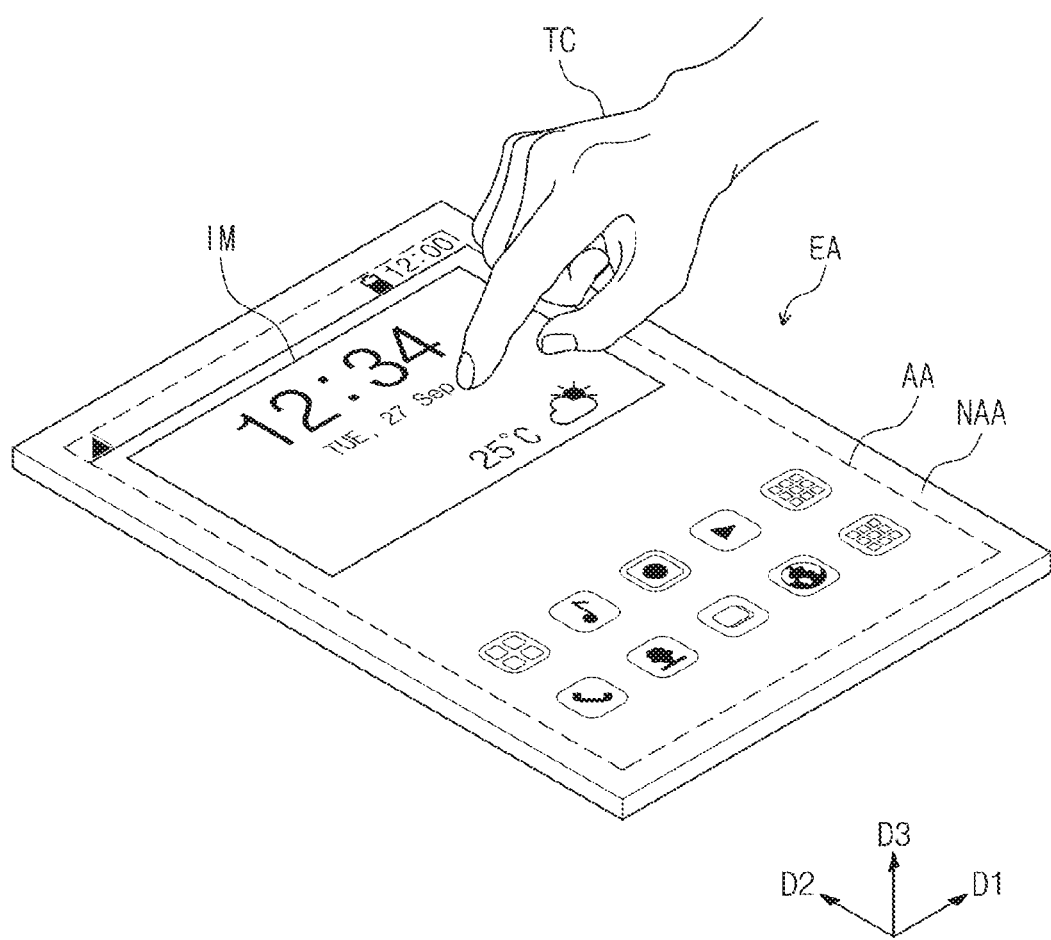
FIG. 1 is a perspective view illustrating an electronic device according to an embodiment of the present disclosure.

FIG. 1 is a perspective view illustrating an electronic device according to an embodiment of the present disclosure. An electronic device EA is activated by an electrical signal applied thereto. The electronic device EA may have an active area AA and a peripheral area NAA on a plane that is defined by a first direction D1 and a second direction D2.

The active area AA may be electrically activated when an electrical signal is supplied thereto. The active area AA may be used to activate various function on the basis of a use of the electronic device EA.

For example, the active area AA may correspond to a sensing area that senses an input provided from the outside. As illustrated in FIG. 1, the electronic device EA may sense an external input TC applied to the active area AA. In this regard, the electronic device EA may function as an input device.

The external input TC corresponds to a finger of a user in FIG. 1. However, embodiments of the present disclosure are not limited thereto. The external input TC may be provided in various forms. For example, the external input TC may be, but not limited to, a contact or a touch of a portion of a human body (e.g., a finger of a user), a force, a pressure, and/or light.

The active area AA may correspond to, for example, a display area that displays predetermined information. The electronic device EA may display an image on the active area AA, and a user may obtain information through the image. In this regard, the electronic device EA may function as an output device.

The peripheral area NAA is disposed to be adjacent to the active area AA. Even though an electrical signal is applied, the peripheral area NAA may neither display an image nor sense an external input.

Signal lines and/or driving elements may be disposed in the peripheral area NAA. The signal lines may be provided for applying signals from the outside to the active area AA, and the driving elements may be provided for driving the active area AA. The peripheral area NAA may be disposed to be adjacent to a side of the active area AA.

In the present embodiment, the peripheral area NAA has a frame shape that surrounds the active area AA. However, embodiments of the present disclosure are not limited thereto. In one embodiment, the peripheral area NAA may be omitted in the electronic device EA. In some embodiments, the shape of the peripheral area NAA may be variously defined and may not be limited to a specific shape.

FIG. 1 illustrates a touch screen device as an example of the electronic device EA. However, embodiments of the present disclosure are not limited thereto. In a certain embodiment, a display function may be omitted in the electronic device EA.

Figure 2:
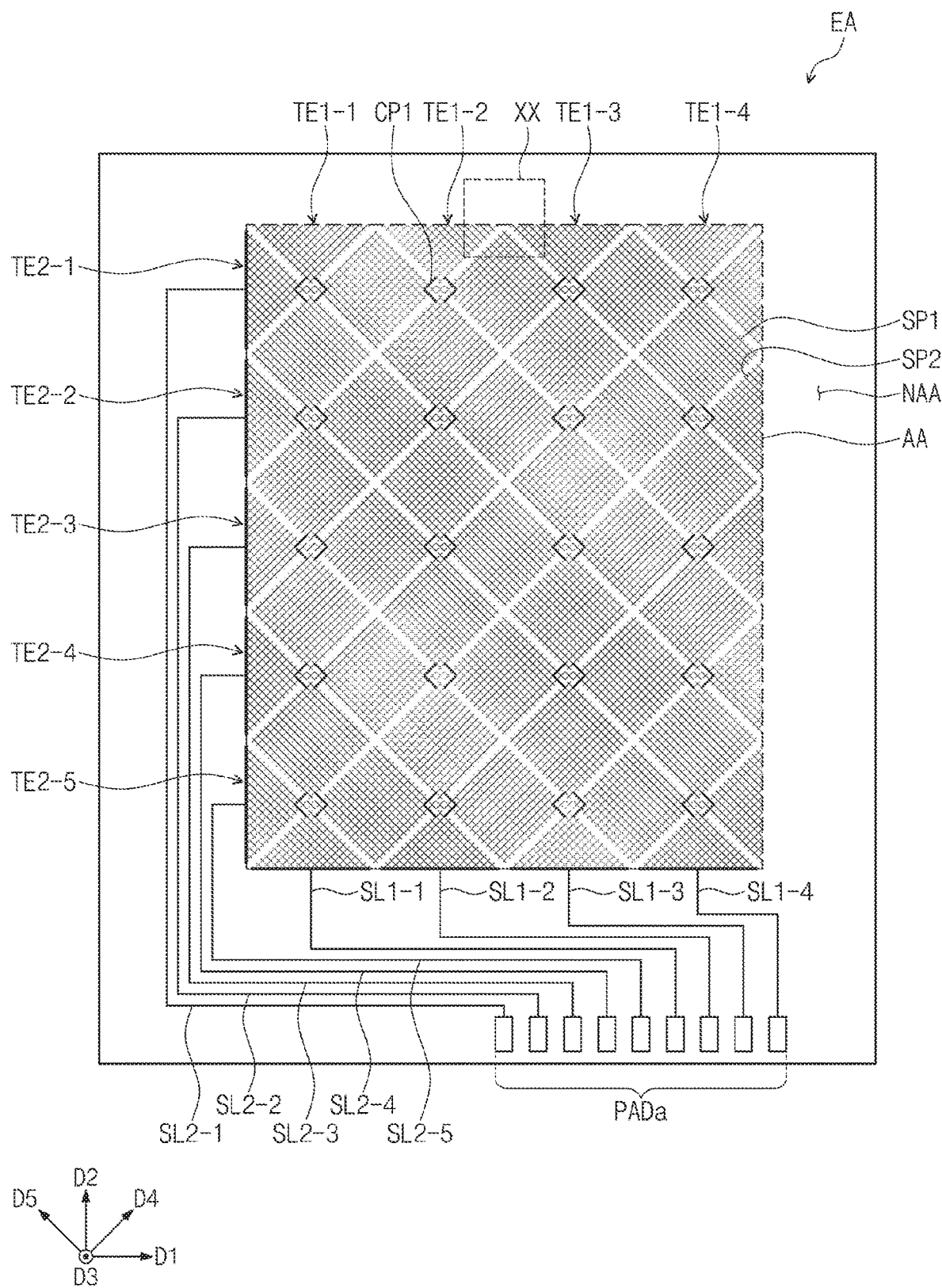
FIG. 2 is a plan view of the electronic device illustrated in FIG. 1.
Figure 3A:
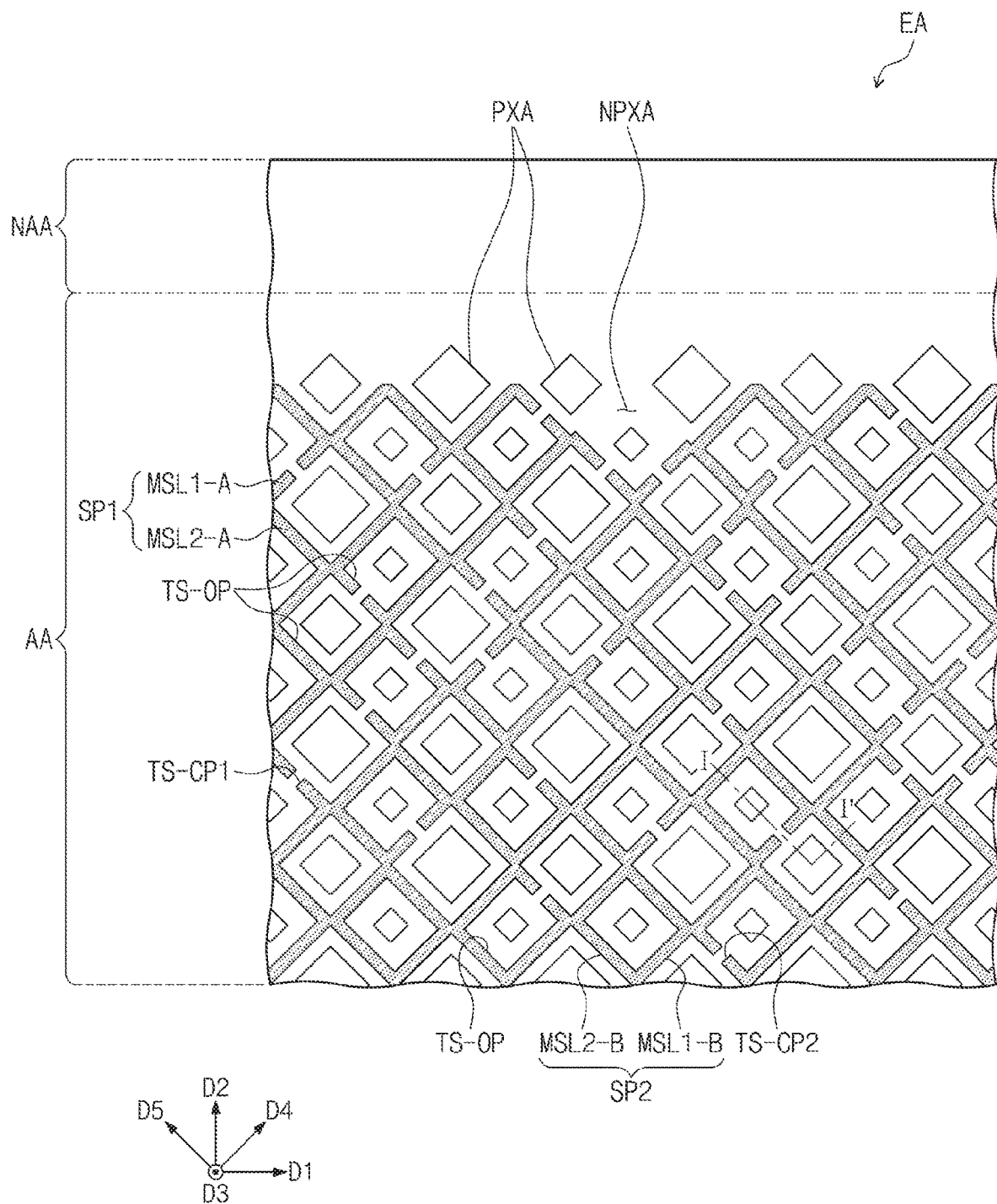
FIG. 3A is an enlarged plan view illustrating an area 'XX' of FIG. 2.
Figure 3B:
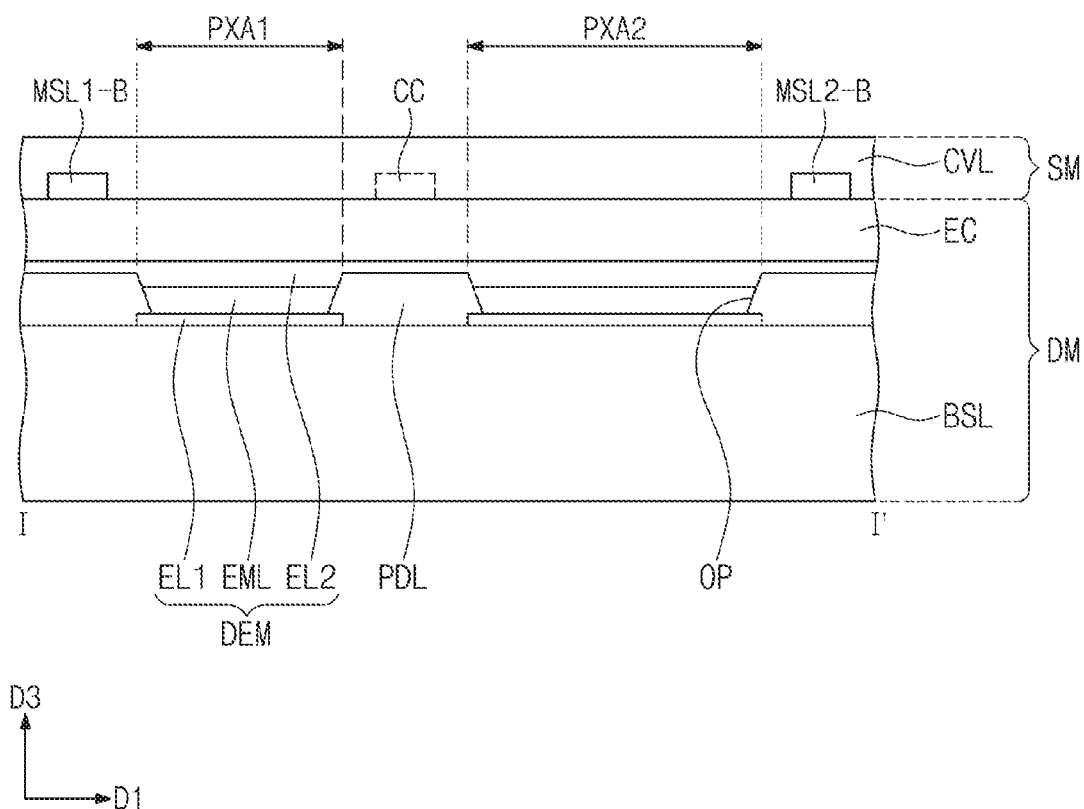
FIG. 3B is a cross-sectional view taken along a line I-I' of FIG. 3A.

FIG. 2 is a plan view of the electronic device illustrated in FIG. 1. FIG. 3A is an enlarged plan view illustrating an area 'XX' of FIG. 2, and FIG. 3B is a cross-sectional view taken along a line I-I' of FIG. 3A. For the purpose of ease and convenience in description and illumination, some elements are omitted in FIGS. 2, 3A, and 3B. Hereinafter, an electronic device EA according to an embodiment of the present disclosure will be described in detail with reference to FIGS. 2, 3A, and 3B.

As illustrated in FIG. 3B, the electronic device EA includes a display member DM and a sensing member SM. In the present embodiment, the sensing member SM is disposed on the display member DM. In the present embodiment, the sensing member SM is illustrated as a single-layered sensing member. However, embodiments of the present disclosure are not limited thereto.

The sensing member SM includes first touch electrodes TE1-1, TE1-2, TE1-3, and TE1-4, second touch electrodes TE2-1, TE2-2, TE2-3, TE2-4, and TE2-5, first touch signal lines SL1-1, SL1-2, SL1-3, and SL1-4 that are respectively connected to the first touch electrodes TE1-1, TE1-2, TE1-3, and TE1-4, second touch signal lines SL2-1, SL2-2, SL2-3, SL2-4, and SL2-5 that are respectively connected to the second touch electrodes TE2-1, TE2-2, TE2-3, TE2-4, and TE2-5, touch pads PADa, and a cover layer CVL.

The first touch electrodes TE1-1, TE1-2, TE1-3, and TE1-4 and the second touch electrodes TE2-1, TE2-2, TE2-3, TE2-4, and TE2-5 may be disposed in the active area AA. The first touch signal lines SL1-1, SL1-2, SL1-3, and SL1-4, the second touch signal lines SL2-1, SL2-2, SL2-3, SL2-4, and SL2-5, and the touch pads PADa may be disposed in the peripheral area NAA.

The first touch electrodes TE1-1, TE1-2, TE1-3, and TE1-4 extend in the second direction D2 and are arranged in the first direction D1. Each of the first touch electrodes TE1-1, TE1-2, TE1-3, and TE1-4 may include a plurality of first sensing patterns SP1. The first sensing patterns SP1 are arranged in the second direction D2 and are connected to each other through first connection portions CP1.

The second touch electrodes TE2-1, TE2-2, TE2-3, TE2-4, and TE2-5 extend in the first direction D1 and are arranged in the second direction D2. Each of the second touch electrodes TE2-1, TE2-2, TE2-3, TE2-4, and TE2-5 may include a plurality of second sensing patterns SP2. The second sensing patterns SP2 are insulated from and intersect the first sensing patterns SP1. The second sensing patterns SP2 are arranged in the first direction D1 and are connected to each other through second connection portions CP2.

The touch pads PADa are connected to the first touch signal lines SL1-1, SL1-2, SL1-3, and SL1-4 and the second touch signal lines SL2-1, SL2-2, SL2-3, SL2-4, and SL2-5. The sensing member SM transmits/receives electrical signals through the first touch signal lines SL1-1, SL1-2, SL1-3, and SL1-4 and the second touch signal lines SL2-1, SL2-2, SL2-3, SL2-4, and SL2-5 to activate the first sensing patterns SP1 and the second sensing patterns SP2.

In one embodiment, the first sensing patterns SP1 and the second sensing patterns SP2 are capacitively coupled to each other. The sensing member SM may sense information of the external input TC (see FIG. 1) by measuring variations in capacitance between the first sensing patterns SP1 and the second sensing patterns SP2 caused by the external input TC.

Referring to FIG. 3A, each of the first sensing patterns SP1 and the second sensing patterns SP2 may have a mesh shape. In more detail, each of the first and second sensing patterns SP1 and SP2 includes a plurality of mesh lines defining a plurality of touch openings TS-OP.

FIG. 3A illustrates planar arrangement relation between the display member DM and the sensing member SM. For the purpose of ease and convenience in description and illumination, planar shapes of light emitting areas PXA are illustrated together with the first sensing patterns SP1 and the second sensing patterns SP2 in FIG. 3A.

Each of the light emitting areas PXA may display a red color, a green color, or a blue color. However, embodiments of the present disclosure are not limited thereto. In certain embodiments, the light emitting areas PXA may further include light emitting areas, each of which displays a magenta color, a cyan color, or a white color. Sizes (or areas) of the light emitting areas PXA may be different from each other on the basis of the colors displayed by the light emitting areas PXA.

In the present embodiment, the light emitting areas PXA may be arranged in a fourth direction D4 and a fifth direction D5. The fourth direction D4 intersects the first and second directions D1 and D2, and the fifth direction intersects the fourth direction D4. In the present embodiment, each of the light emitting areas PXA may have a diamond shape having sides that are defined by the fourth and fifth directions D4 and D5.

In FIG. 3A, the first and second sensing patterns SP1 and SP2 are shaded for the purpose of easy identification. The first and second sensing patterns SP1 and SP2 are disposed to overlap with a non-light emitting area NPXA.

As described above, each of the first and second sensing patterns SP1 and SP2 includes the plurality of mesh lines. The mesh lines are disposed in the non-light emitting area NPXA.

In more detail, each of the first sensing patterns SP1 includes a plurality of first mesh lines MSL1-A extending in the fourth direction D4 and spaced apart from each other in the fifth direction D5, and a plurality of second mesh lines MSL2-A extending in the fifth direction D5 and spaced apart from each other in the fourth direction D4. The second mesh lines MSL2-A are cross-linked to the first mesh lines MSL1-A. Each of the second sensing patterns SP2 includes a plurality of first mesh lines MSL1-B and a plurality of second mesh lines MSL2-B that are cross-linked to the first mesh lines MSL1-B.

The first mesh lines MSL1-A and the second mesh lines MSL2-A define the touch openings TS-OP. Likewise, the first mesh lines MSL1-B and the second mesh lines MSL2-B also define the touch openings TS-OP.

The touch openings TS-OP may have diamond shapes corresponding to the shapes of the light emitting areas PXA and may be defined in areas respectively corresponding to the light emitting areas PXA. Areas of the touch openings TS-OP may be equal to or greater than areas of the light emitting areas PXA when viewed in a plan view. Each of the touch openings TS-OP may entirely overlap with a corresponding one of the light emitting areas PXA.

Referring to FIG. 3B, the display member DM may include a base layer BSL, a pixel defining layer PDL, display elements DEM, and a sealing layer EC. FIG. 3B illustrates a first light emitting area PXA1 and a second light emitting area PXA2 of the light emitting areas PXA.

Even though not shown in the drawings, the base layer BSL may include a plurality of insulating layers and a plurality of conductive layers. Thin film transistors and capacitors that are connected to the display elements DEM may be formed in the plurality of conductive layers and the plurality of insulating layers.

Each of the display elements DEM is disposed on the base layer BSL. The display element DEM may emit light in response to an electrical signal transmitted through the connected thin film transistor and capacitor, thereby displaying an image.

Various display elements may be used as the display element DEM. For example, the display element DEM may be an electrophoretic element, a liquid crystal capacitor, an electro-wetting element, or an organic light emitting element. In the present embodiment, the organic light emitting element is described as an example of the display element DEM.

The pixel defining layer PDL is disposed on the base layer BSL. Openings OP are defined in the pixel defining layer PDL. Each of the openings OP may define an area in which one display element DEM is formed.

The display element DEM includes a first electrode ELL a light emitting layer EML, and a second electrode EL2. The display element DEM may activate the light emitting layer EML by a potential difference between the first and second electrodes EL1 and EL2, thereby emitting light. Thus, the light emitting areas PXA may correspond to areas in which the light emitting layers EML are disposed.

On the other hand, a size (or an area) of the first light emitting area PXA1 may be different from that of the second light emitting area PXA2. In the present embodiment, the size (or the area) of the second light emitting area PXA2 is greater than that of the first light emitting area PXA1. This is because a color of light emitted from the first light emitting area PXA1 is different from a color of light emitted from the second light emitting area PXA2 as described above. Thus, it is possible to improve light efficiencies of the light emitting areas that emit lights of different colors.

The sealing layer EC covers the display elements DEM and the pixel defining layer PDL. The sealing layer EC may include a plurality of organic and/or inorganic layers. The sealing layer EC prevents moisture from permeating into the display element DEM and protects the display element DEM. In addition, the sealing layer EC electrically isolates the display member DM from the sensing member.

The sensing member SM is disposed on the sealing layer EC of the display member DM. However, embodiments of the present disclosure are not limited thereto. In certain embodiments, the sensing member SM may be disposed under the sealing layer EC, or a member (not shown) such as a color filter may be disposed between the sensing member SM and the sealing layer EC.

The sensing member SM may include the cover layer CVL, as described above. The cover layer CVL is disposed on the sensing patterns SP1 and SP2 to protect the sensing patterns SP1 and SP2. The cover layer CVL includes an insulating material.

As illustrated in FIG. 3B, the first mesh line MSL1-B and the second mesh line MSL2-B are disposed to overlap with the pixel defining layer PDL when viewed in a plan view. The first mesh line MSL1-B and the second mesh line MSL2-B do not overlap with the light emitting areas PXA1 and PXA2.

Thus, the influence of the sensing patterns SP1 and SP2 on displaying characteristics of the electronic device EA may be reduced, and the mesh lines MSL1-B and MSL2-B can be formed of an opaque material to increase or improve the degree of freedom for selecting a material of the sensing patterns SP1 and SP2.

Meanwhile, in the present embodiment, each of the mesh lines may have a shape that is partially cut. In more detail, as illustrated in FIG. 3A, each of the first mesh lines MSL1-A and MSL1-B includes first cutting portions TS-CP1 that are partially cut. Each of the second mesh lines MSL2-A and MSL2-B includes second cutting portions TS-CP2 that are partially cut. Thus, a cut space CC may be formed as illustrated in FIG. 3B. The cut space CC may correspond to a region that is defined by the cutting portion formed by removing a portion of the mesh line.

The sensing patterns SP1 and SP2 according to an embodiment of the present disclosure include the cut spaces CC including the first cutting portions TS-CP1 and the second cutting portions TS-CP2, thereby reducing differences in reflectivity between the insides of the sensing patterns SP1 and SP2 and boundaries of the sensing patterns SP1 and SP2. As a result, a problem that sensing patterns SP1 and SP2 are viewed by reflection of external light may be prevented to realize the electronic device EA with improved visibility.

Referring again to FIG. 2, even though not shown in detail in the drawings, the first touch signal lines SL1-1 to SL1-4 and the second touch signal lines SL2-1 to SL2-5 may also include mesh lines. However, embodiments of the present disclosure are not limited thereto. In certain embodiments, the first touch signal lines SL1-1 to SL1-4 and the second touch signal lines SL2-1 to SL2-5 may be, but not limited to, linear conductive patterns.

Figure 4A:
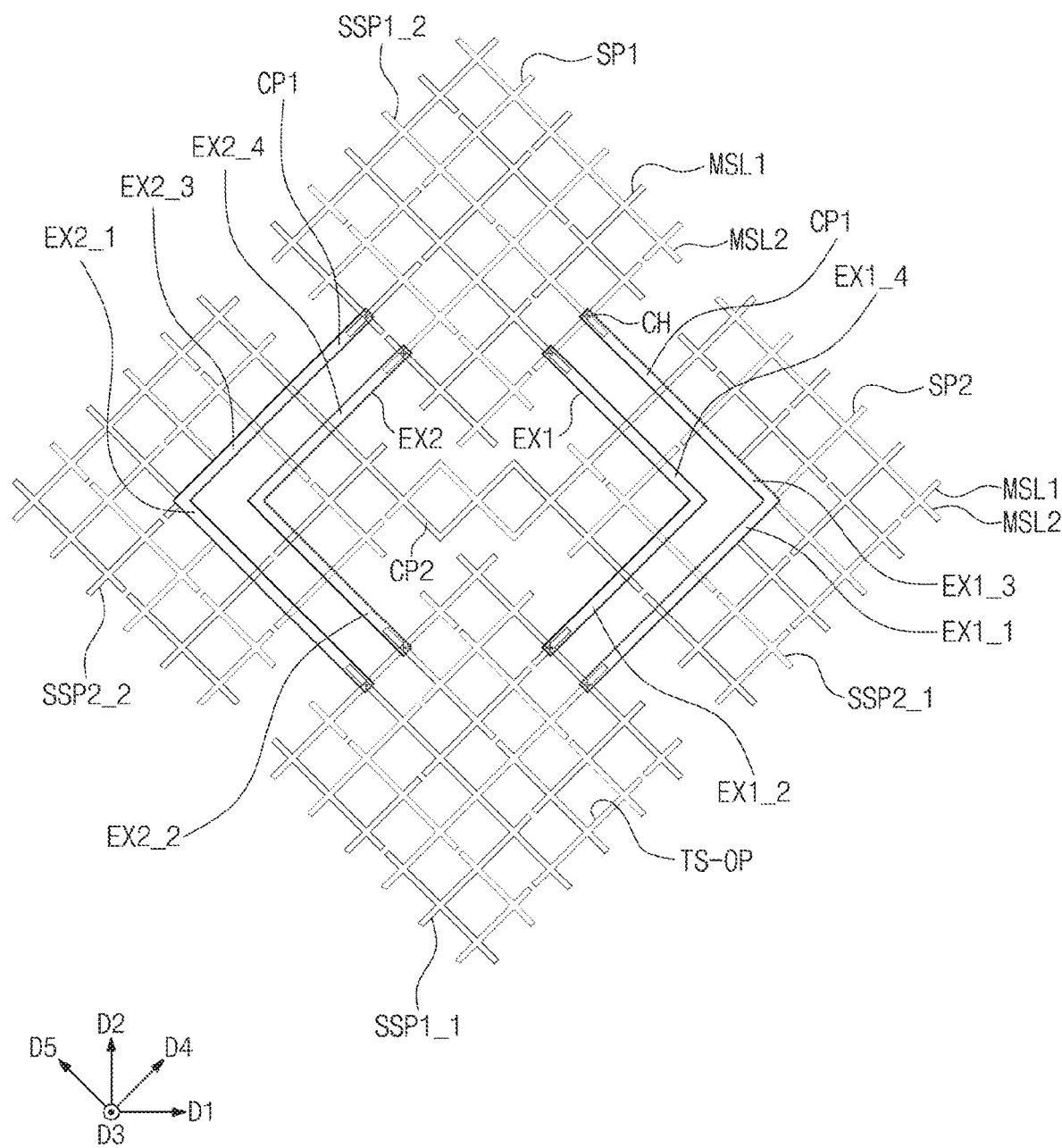
FIG. 4A is an enlarged plan view illustrating some elements of FIG. 3A.
Figure 4B:
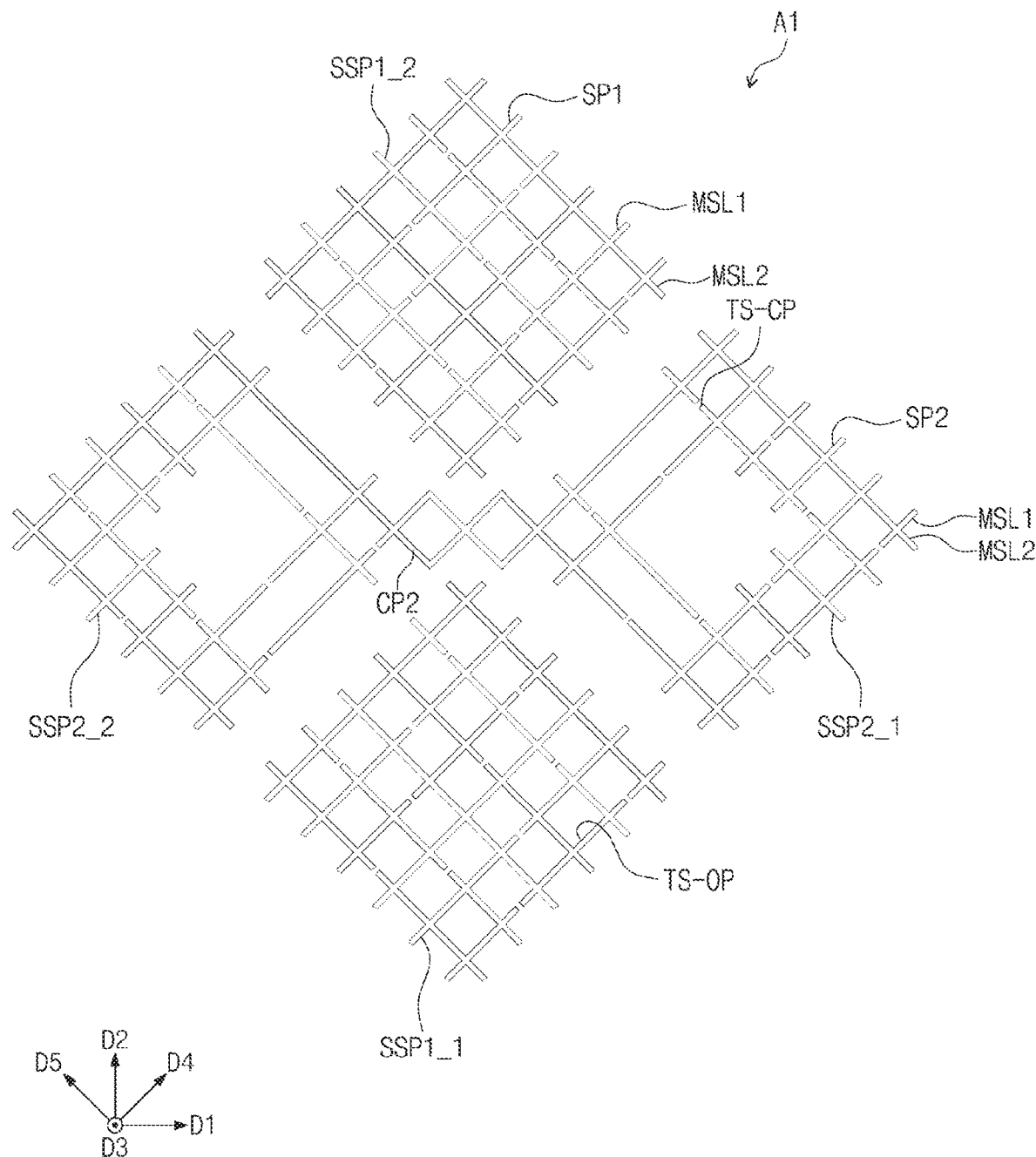
FIGS. 4B and 4C are plan views illustrating some elements of FIG. 4A.
Figure 4C:
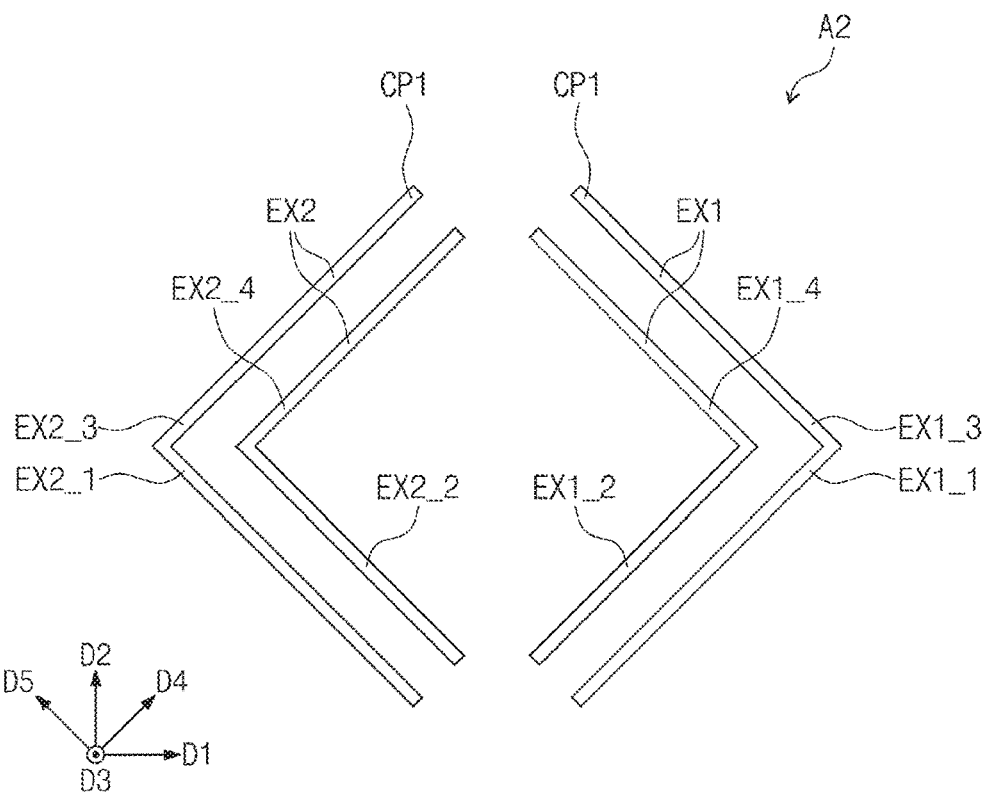

FIG. 4A is an enlarged plan view illustrating some elements of FIG. 3A. FIGS. 4B and 4C are plan views illustrating some elements of FIG. 4A. For the purpose of ease and convenience in description and illumination, FIGS. 4B and 4C illustrate elements included in layers different from each other.

In more detail, FIG. 4B illustrates elements, included in a first layer A1, among elements illustrated in FIG. 4A, and FIG. 4C illustrates elements, included in a second layer A2, among the elements illustrated in FIG. 4A. The second layer A2 is disposed on the first layer A1. Hereinafter, an embodiment of the present disclosure will be described with reference to FIGS. 4A to 4C. Meanwhile, the same elements as described with reference to FIGS. 1, 2, 3A, and 3B are indicated by the same reference designators, and the descriptions thereof are omitted for the purpose of ease and convenience in description and illumination.

FIG. 4A is an enlarged view that illustrates the connection portion connecting the first sensing patterns SP1 and the connection portion connecting the second sensing patterns SP2. A first bottom-side sensing pattern SSP1_1 and a first top-side sensing pattern SSP1_2 are illustrated as some of the first sensing patterns SP1 in FIG. 4A, and a second right-side sensing pattern SSP2_1 and a second left-side sensing pattern SSP2_2 are illustrated as some of the sensing patterns SP2 in FIG. 4A.

Each of the first sensing patterns SP1 and the second sensing patterns SP2 includes first mesh lines MSL1 extending in the fourth direction D4 and second mesh lines MSL2 extending in the fifth direction D5. Meanwhile, sizes (or areas) of the touch openings TS-OP defined by the first mesh lines MSL1 and the second mesh lines MSL2 are shown to be equal to each other in FIGS. 4A and 4B for the purpose of ease and convenience in description and illumination.

In the present embodiment, the first connection portion CP1 is disposed in a layer different from a layer in which the first sensing patterns SP1, the second sensing patterns SP2, and the second connection portion CP2 are disposed. Referring to FIGS. 4A and 4B, the first sensing patterns SP1, the second sensing patterns SP2, and the second connection portion CP2 have mesh shapes and are included in the first layer A1.

Some of the mesh lines MSL1 and MSL2 of the second right-side sensing pattern SSP2_1 and the second left-side sensing pattern SSP2_2 extend to define the second connection portion CP2. In the present embodiment, the second connection portion CP2 may have a mesh shape having two touch openings TS-OP and may extend in the first direction D1. The first bottom-side sensing pattern SSP1_1 and the first top-side sensing pattern SSP1_2 are spaced apart from each other with the second connection portion CP2 interposed therebetween.

The first sensing patterns SP1 and the second sensing patterns SP2 include the cutting portions TS-CP, as described above. Each of the first bottom-side sensing pattern SSP1_1 and the first top-side sensing pattern SSP1_2 includes the cutting portions TS-CP that are spaced apart from each other and are formed in the first mesh lines MSL1 and/or the second mesh lines MSL2. Likewise, the cutting portions TS-CP are formed in the second right-side sensing pattern SSP2_1 and the left-side sensing pattern SSP2_2.

Meanwhile, areas from which the touch openings TS-OP are removed exist in the second right-side sensing pattern SSP2_1 and the second left-side sensing pattern SSP2_2. In other words, each of the second right-side sensing pattern SSP2_1 and the second left-side sensing pattern SSP2_2 has portions in which the first mesh lines MSL1 and the second mesh lines MSL2 are removed.

These removed portions of the mesh lines may be provided in areas where the first connection portion CP1 is placed preventing overlapping between the first connection portion CP1 and the second sensing patterns SP2. Since the portions of the mesh lines of the second right-side and left-side sensing patterns SSP2_1 and SSP2_2 are removed in areas that overlap with the first connection portion CP1, the first connection portion CP1 may not overlap with the second sensing patterns SP2, thereby preventing occurrence of a parasitic capacitor or a short between the first connection portion CP1 and the second sensing patterns SP2, and improving reliability of the electronic device.

Referring to FIGS. 4A and 4C, the first connection portion CP1 is disposed in the layer different from the layer in which the first sensing patterns SP1 are disposed. In the present embodiment, the first connection portion CP1 is disposed in the second layer A2.

Thus, the first connection portion CP1 is connected to the first sensing patterns SP1 through contact holes CH. The first bottom-side sensing pattern SSP1_1 and the first top-side sensing pattern SSP1_2 that are spaced apart from each other are electrically connected to each other through the first connection portion CP1.

The first connection portion CP1 includes a first extension EX1 and a second extension EX2 that are spaced apart from each other in the first direction D1 with the second connection portion CP2 interposed therebetween when viewed in a plan view. The first extension EX1 and the second extension EX2 may be symmetrical with respect to the second connection portion CP2.

Each of the first extension EX1 and the second extension EX2 may be provided in plurality. In more detail, there are two first extensions EX1 including first, second, third, and fourth sub-extensions EX1_1, EX1_2, EX1_3, and EX1_4. The first sub-extension EX1_1 and the third sub-extension EX1_3 are connected to each other to constitute one of the first extensions EX1, and the second sub-extension EX1_2 and the fourth sub-extension EX1_4 are connected to each other to constitute the other of the first extensions EX1.

Similarly, there are two second extensions EX2 including fifth, sixth, seventh, and eighth sub-extensions EX2_1, EX2_2, EX2_3, and EX2_4. The fifth sub-extension EX2_1 and the seventh sub-extension EX2_3 are connected to each other to constitute one of the second extensions EX2, and the sixth sub-extension EX2_2 and the eighth sub-extension EX2_4 are connected to each other to constitute the other of the second extensions EX2.

Each of the first and second extensions EX1 and EX2 is connected to the first sensing patterns SP1 through a respective contact hole CH. Since the first sensing patterns SP1 are electrically connected to each other through the plurality of extensions EX1 and EX2, an electrical signal can be transmitted between the first sensing patterns SP1 while reducing electrical noise and improving touch sensitivity.

Figure 4D:
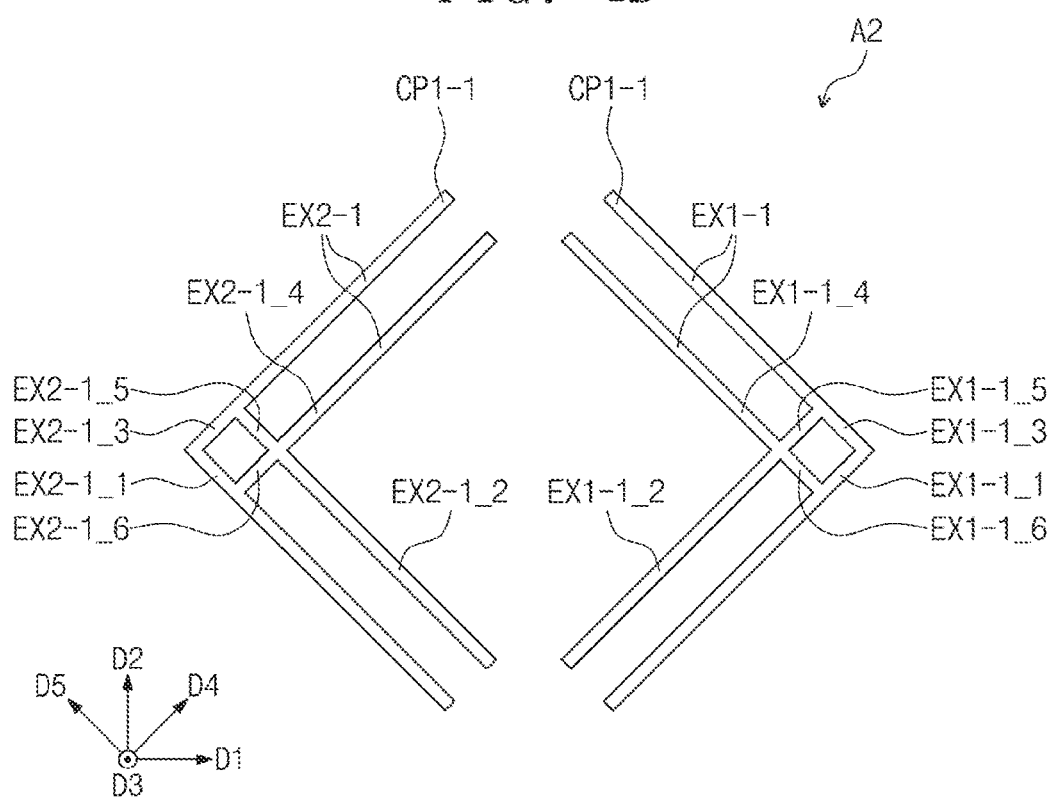
FIG. 4D is a plan view illustrating another example of some elements of FIG. 4A.

On the other hand, as illustrated in FIG. 4D, a first connection portion CP1-1 according to another embodiment may include first extensions EX1-1 that are connected to each other, and second extensions EX2-1 that are connected to each other.

The first extensions EX1-1 may include first, second, third, and fourth sub-extensions EX1-1_1, EX1-1_2, EX1-1_3, and EX1-1_4 respectively corresponding to the first, second, third, and fourth sub-extensions EX1_1, EX1_2, EX1_3, and EX1_4 illustrated in FIG. 4C and may further include first and second connection extensions EX1-1_5 and EX1-1_6. The first connection extension EX1-1_5 extends in the fourth direction D4 to connect the third and fourth sub-extensions EX1-1_3 and EX1-1_4 to each other, and the second connection extension EX1-1_6 extends in the fifth direction D5 to connect the first and second sub-extensions EX1-1_1 and EX1-1_2. Thus, the first extensions EX1-1 may be connected to each other to constitute a single electrode pattern.

The second extensions EX2-1 and the first extensions EX1-1 are symmetrical with respect to an imaginary line extending in the second direction D2 therebetween. Thus, the second extensions EX2-1 may include fifth, sixth, seventh, and eighth sub-extensions EX2-1_1, EX2-1_2, EX2-1_3, and EX2-1_4 respectively corresponding to the fifth, sixth, seventh, and eighth sub-extensions EX2_1, EX2_2, EX2_3, and EX2_4 illustrated in FIG. 4C and may further include third and fourth connection extensions EX2-1_5 and EX2-1_6. Thus, the second extensions EX2-1 may be connected to each other to constitute a single electrode pattern.

An electronic device according to an embodiment of the present disclosure may include at least one of electrode patterns having various shapes and may not be limited to a specific embodiment.

Figure 5A:
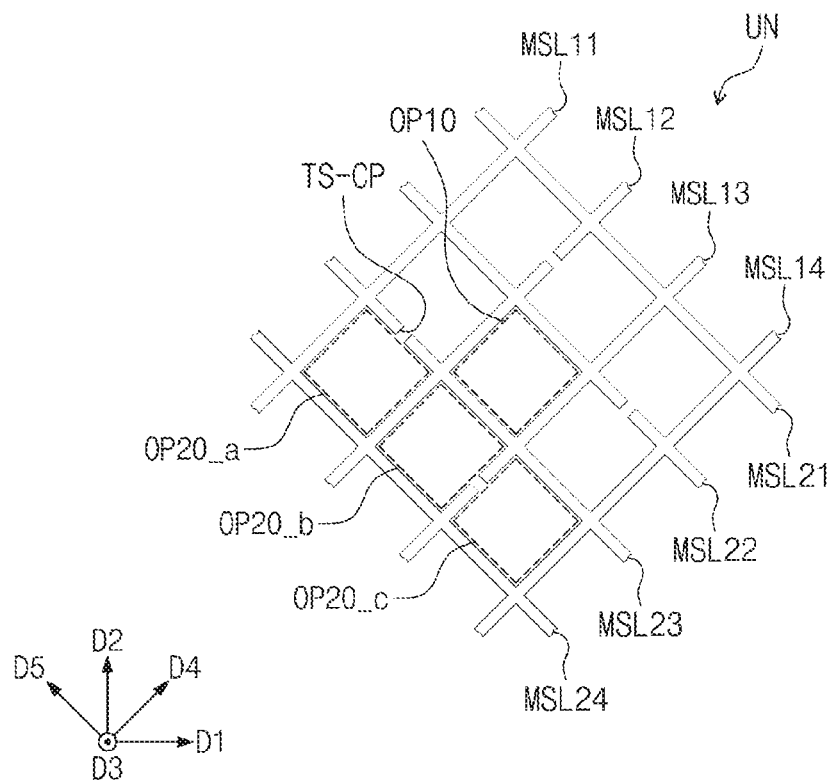
FIG. 5A is a plan view illustrating a unit mesh pattern according to an embodiment of the present disclosure.
Figure 5B:
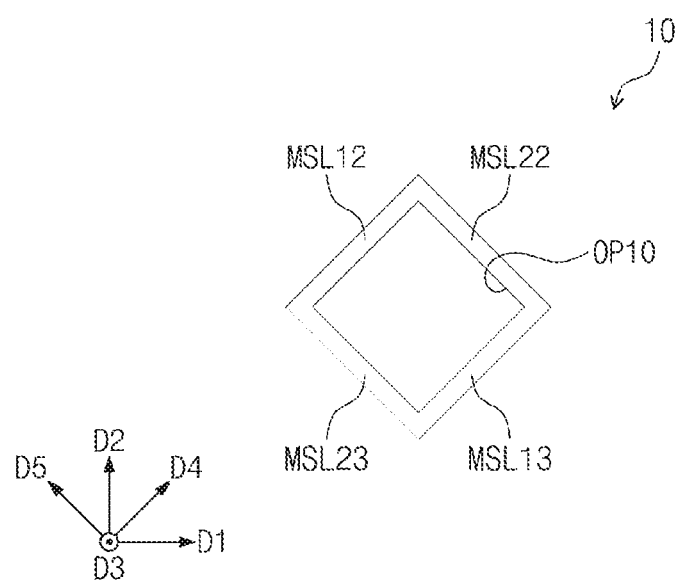
FIGS. 5B and 5C are plan views illustrating some elements of the unit mesh pattern of FIG. 5A.
Figure 5C:
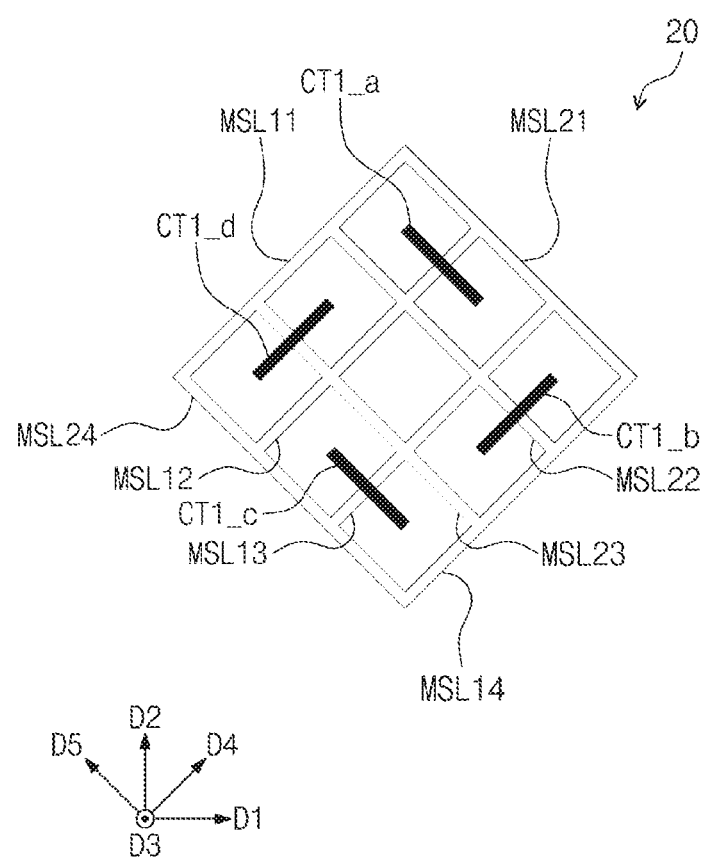

FIG. 5A is a plan view illustrating a unit mesh pattern according to an embodiment of the present disclosure. FIGS. 5B and 5C are plan views illustrating some elements of the unit mesh pattern of FIG. 5A.

FIG. 5A illustrates a partial area, corresponding to a unit mesh pattern UN, among the first sensing patterns SP1 and the second sensing patterns SP2 illustrated in FIG. 2A. Each of the first and second sensing patterns SP1 and SP2 may have a shape in which the unit mesh patterns UN are repeatedly and continuously arranged.

Referring to FIG. 5A, the unit mesh pattern UN may be defined by eight mesh lines intersecting each other. In more detail, the unit mesh pattern UN may be defined by first to fourth mesh lines MSL11, MSL12, MSL13, and MSL14 extending in parallel to each other in the fourth direction D4 and fifth to eighth mesh lines MSL21, MSL22, MSL23, and MSL24 extending in parallel to each other in the fifth direction D5.

The first to fourth mesh lines MSL11, MSL12, MSL13, and MSL14 may substantially correspond to some of the first mesh lines MSL1 illustrated in FIG. 4A, and the fifth to eighth mesh lines MSL21, MSL22, MSL23, and MSL24 may substantially correspond to some of the second mesh lines MSL2 illustrated in FIG. 4A.

The unit mesh pattern UN according to an embodiment of the present disclosure may include a plurality of openings. The number of the plurality of openings may be (2N+1)×(2N+1) where 'N' is a natural number, and the plurality of openings may be arranged in a matrix form defined by the fourth and fifth directions D4 and D5.

For example, as illustrated in FIG. 5A, the unit mesh pattern UN may include nine openings that are arranged in a 3×3 matrix form. The openings may include a central opening OP10 and peripheral openings OP20_a, OP20_b, and OP20_c.

The central opening OP10 may be disposed at a center of the unit mesh pattern UN. The second and third mesh lines MSL12 and MSL13 among the first to fourth mesh lines MSL11 to MSL14 may be relatively close to the center of the unit mesh pattern UN, and the sixth and seventh mesh lines MSL22 and MSL23 among the fifth to eighth mesh lines MSL21 to MSL24 may be relatively close to the center of the unit mesh pattern UN. The central opening OP10 may be defined by the second and third mesh lines MSL12 and MSL13 and the sixth and seventh mesh lines MSL22 and MSL23 that intersect the second and third mesh lines MSL12 and MSL13.

The second, third, sixth, and seventh mesh lines MSL12, MSL13, MSL22, and MSL23 defining the central opening OP10 may define a first sub-mesh pattern 10. FIG. 5B illustrates the first sub-mesh pattern 10.

As illustrated in FIGS. 5A and 5B, the first sub-mesh pattern 10 may be a pattern that defines the central opening OP10. The first sub-mesh pattern 10 has a diamond shape when viewed in a plan view. Portions of the second, third, sixth, and seventh mesh lines MSL12, MSL13, MSL22, and MSL23 may correspond to four sides of the first sub-mesh pattern 10, respectively.

Here, the portions of the second, third, sixth, and seventh mesh lines MSL12, MSL13, MSL22, and MSL23 defining the first sub-mesh pattern 10 do not include a cut portion. Thus, the central opening OP10 may not be connected to neighboring openings but may be defined as a closed area that is surrounded by the second, third, sixth, and seventh mesh lines MSL12, MSL13, MSL22, and MSL23.

Referring again to FIG. 5A, the peripheral openings OP20_a, OP20_b, and OP20_c may be arranged along an edge of the central opening OP10. The peripheral openings OP20_a, OP20_b, and OP20_c may be defined by the intersection of the first to fourth mesh lines MSL11 to MSL14 and the fifth to eighth mesh lines MSL21 to MSL24.

The first to fourth mesh lines MSL11 to MSL14 and the fifth to eighth mesh lines MSL21 to MSL24 defining the peripheral openings OP20_a, OP20_b, and OP20_c may define a second sub-mesh pattern 20. FIG. 5C illustrates the second sub-mesh pattern 20 for the purpose of ease and convenience in description.

As illustrated in FIGS. 5A and 5C, the second sub-mesh pattern 20 has the peripheral openings OP20_a, OP20_b, and OP20_c. The second sub-mesh pattern 20 has a quadrilateral frame shape that surrounds the first sub-mesh pattern 10. The first to fourth mesh lines MSL11 to MSL 14 and the fifth to eighth mesh lines MSL21 to MSL24 may correspond to sides which define the frame shape of the second sub-mesh pattern 20.

In more detail, outer sides of the frame shape may correspond to portions of the first and fourth mesh lines MSL11 and MSL14, disposed relatively outside, among the first to fourth mesh lines MSL11, MSL12, MSL13, and MSL14 and portions of the fifth and eighth mesh lines MSL21 and MSL24, disposed relatively outside, among the fifth to eighth mesh lines MSL21, MSL22, MSL23, and MSL24. Inner sides of the frame shape may correspond to portions of the second and third mesh lines MSL12 and MSL13, disposed relatively inside, among the first to fourth mesh lines MSL12, MSL12, MSL13, and MSL13 and portions of the sixth and seventh mesh lines MSL22 and MSL23, disposed relatively inside, among the fifth to eighth mesh lines MSL22, MSL22, MSL23, and MSL23.

The four mesh lines MSL12, MSL13, MSL22, and MSL23 defining the inner sides may additionally divide the quadrilateral frame shape of the second sub-mesh pattern 20 into a plurality of areas. Thus, the first to fourth mesh lines MSL11 to MSL14 and the fifth to eighth mesh lines MSL21 to MSL24 may define eight peripheral openings OP20_a, OP20_b, and OP20_c, arranged to surround the central opening OP10, in the second sub-mesh pattern 20.

Meanwhile, the four mesh lines MSL12, MSL13, MSL22, and MSL23 defining the inner sides of the second sub-mesh pattern 20 may be the four mesh lines MSL12, MSL13, MSL22, and MSL23 defining the four sides of the first sub-mesh pattern 10. In other words, the four mesh lines MSL12, MSL13, MSL22, and MSL23 defining the inner sides may be included in or shared by both the first sub-mesh pattern 10 and the second sub-mesh pattern 20. Thus, the shape of the second sub-mesh pattern 20 is substantially the same as the shape of the unit mesh pattern UN.

The second sub-mesh pattern 20 may include a plurality of cutting lines CT1_a, CT1_b, CT1_c, and CT1_d. The cutting lines CT1_a, CT1_b, CT1_c, and CT1_d may be imaginary lines that cut portions of the mesh lines, respectively.

Each of the cutting lines CT1_a, CT1_b, CT1_c, and CT1_d may have a line shape that links two centers of two openings adjacent to each other with a predetermined mesh line interposed therebetween. The cutting portion TS-CP is defined in a portion of the mesh line that overlaps with each of the cutting lines CT1_a, CT1_b, CT1_c, and CT1_d. In FIG. 5C, the cutting lines CT1_a, CT1_b, CT1_c, and CT1_d are shown as dark lines for the purpose of ease and convenience in description and illumination.

In the present embodiment, the cutting lines CT1_a, CT1_b, CT1_c, and CT1_d are spaced apart from each other. The cutting lines CT1_a, CT1_b, CT1_c, and CT1_d are arranged to surround the central opening OP10 in the second sub-mesh pattern 20.

A longitudinal direction of the cutting lines CT1_a, CT1_b, CT1_c, and CT1_d may be different from that of others cutting lines CT1_a, CT1_b, CT1_c, and CT1_d. For example, the cutting lines CT1_a, CT1_b, CT1_c, and CT1_d may include first and third cutting lines CT1_a and CT1_c that extend in the fifth direction D5, and second and fourth cutting lines CT1_b and CT1_d that extend in the fourth direction D4.

The cutting lines CT1_a, CT1_b, CT1_c, and CT1_d may be arranged along the quadrilateral frame shape of the second sub-mesh pattern 20. In addition, the cutting lines CT1_a, CT1_b, CT1_c, and CT1_d may be arranged in such a way that each of the cutting lines CT1_a, CT1_b, CT1_c, and CT1_d extends in a direction parallel to an outer side adjacent thereto.

Thus, the fourth and second cutting lines CT1_d and CT1_b adjacent to the outer sides defined by the first and fourth mesh lines MSL11 and MSL14 may extend in the fourth direction D4. The first and third cutting lines CT1_a and CT1_c adjacent to the outer sides defined by the fifth and eighth mesh lines MSL21 and MSL24 may extend in the fifth direction D5.

The first to fourth cutting lines CT1_a, CT1_b, CT1_c, and CT1_d are disposed along a clockwise direction in the second sub-mesh pattern 20 to cut four mesh lines MSL12, MSL22, MSL13, and MSL23 among the mesh lines defining a plurality of the openings.

In more detail, as illustrated in FIG. 5C, the first cutting line CT1_a cuts the second mesh line MSL12. The second cutting line CT1_b is spaced apart from the first cutting line CT1_a with the third mesh line MSL13 interposed therebetween and cuts the sixth mesh line MSL22. The third cutting line CT1_c is spaced apart from the second cutting line CT1_b with the seventh mesh line MSL23 interposed therebetween and cuts the third mesh line MSL13. The fourth cutting line CT1_d is spaced apart from the third cutting line CT1_c with the second mesh line MSL12 interposed therebetween and cuts the seventh mesh line MSL23.

Referring again to FIG. 5A, as a result, the unit mesh pattern UN may include the plurality of peripheral openings surrounding the central opening OP10, and two adjacent peripheral openings among the peripheral openings may be connected or opened to each other through the cutting portion TS-CP. The peripheral openings may include first to third openings OP20_a, OP20_b, and OP20_c adjacent to each other. The second and third openings OP20_b and OP20_c among the first to third openings OP20_a, OP20_b, and OP20_c may be connected or opened to each other through the cutting portion TS-CP. The cutting portion TS-CP connecting the second and third openings OP20_b and OP20_c may be a cutting portion formed by the third cutting line CT1_c illustrated in FIG. 5C.

The first and second openings OP20_a and OP20_b among the first to third openings OP20_a, OP20_b, and OP20_c are not connected or opened to each other. A portion of the second mesh line MSL12 that is disposed between the first and second openings OP20_a and OP20_b does not overlap with the cutting line. However, the first opening OP20_a may be connected or opened to another peripheral opening that is adjacent thereto with the seventh mesh line MSL23 interposed therebetween, through a cutting portion formed by the first cutting line CT1_d.

The unit mesh pattern UN according to an embodiment of the present disclosure may be provided in plurality, and the plurality of unit mesh patterns UN may constitute each of the first and second sensing patterns SP1 and SP2. The cutting portions TS-CP control visibility in the sensing patterns SP1 and SP2. Due to the cutting portions TS-CP defined sporadically, it may be difficult for a user to distinguish between a boundary of each of the sensing patterns SP1 and SP2 and the inside of each of the sensing patterns SP1 and SP2. Thus, a problem that the sensing patterns SP1 and SP2 are visible to a user may be prevented improving the visibility of the electronic device.

Figure 6A:
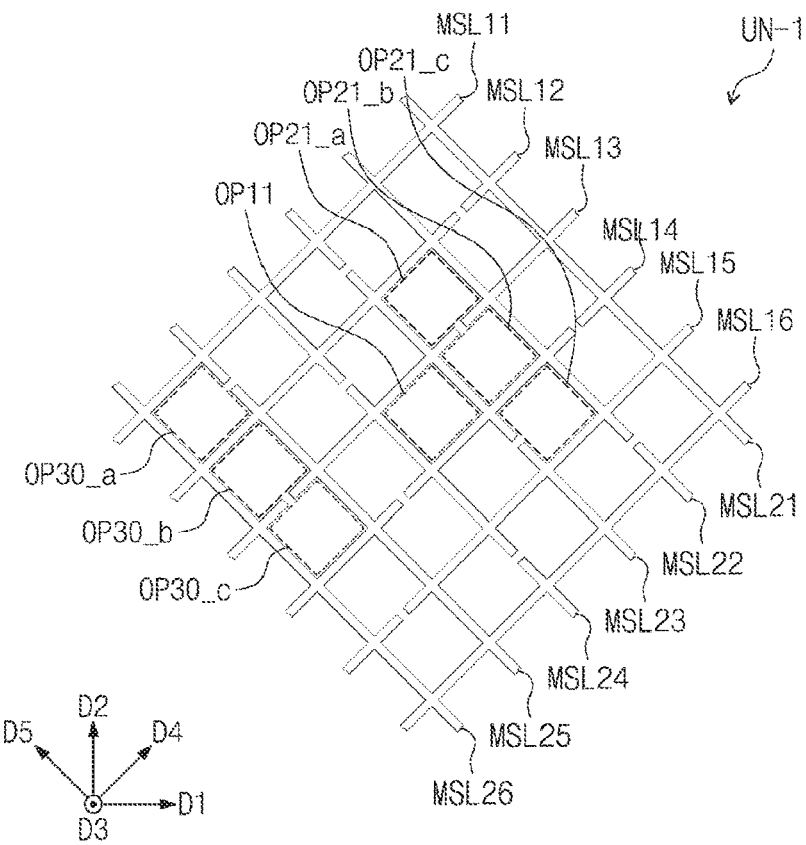
FIG. 6A is a plan view illustrating a unit mesh pattern according to an embodiment of the present disclosure.
Figure 6B:
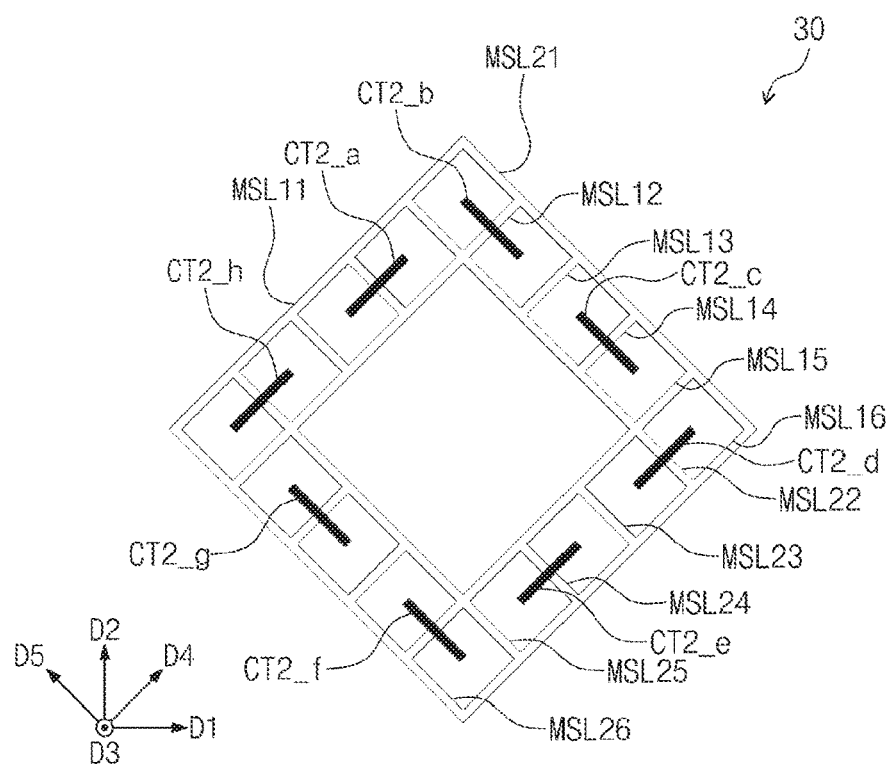
FIG. 6B is a plan view illustrating some elements of the unit mesh pattern of FIG. 6A.

FIG. 6A is a plan view illustrating a unit mesh pattern according to an embodiment of the present disclosure. FIG. 6B is a plan view illustrating some elements of the unit mesh pattern of FIG. 6A.

FIG. 6A illustrates a partial area, corresponding to a unit mesh pattern UN-1, of the first and second sensing patterns SP1 and SP2 illustrated in FIG. 2A. Each of the first sensing patterns SP1 and the second sensing patterns SP2 may have a shape in which the unit mesh patterns UN-1 are continuously arranged.

Referring to FIG. 6A, the unit mesh pattern UN-1 may be defined by twelve mesh lines intersecting each other. In more detail, the unit mesh pattern UN-1 may be defined by first to sixth mesh lines MSL11, MSL12, MSL13, MSL14, MSL15, and MSL16 extending in the fourth direction D4 in parallel to each other and seventh to twelfth mesh lines MSL21, MSL22, MSL23, MSL24, MSL25, and MSL26 extending in the fifth direction D5 in parallel to each other.

The first to sixth mesh lines MSL11, MSL12, MSL13, MSL14, MSL15, and MSL16 may substantially correspond to some of the first mesh lines MSL1 illustrated in FIG. 4A, and the seventh to twelfth mesh lines MSL21, MSL22, MSL23, MSL24, MSL25, and MSL26 may substantially correspond to some of the second mesh lines MSL2 illustrated in FIG. 4A. The unit mesh pattern UN-1 may have a diamond shape defined by the fourth direction D4 and the fifth direction D5.

The unit mesh pattern UN-1 may include a plurality of openings. The openings may include a central opening OP11, a plurality of first peripheral openings OP21_a, OP21_b, and OP21_c, and a plurality of second peripheral openings OP30_a, OP30_b, and OP30_c.

The central opening OP11 may be disposed at a center of the unit mesh pattern UN-1. The third and fourth mesh lines MSL13 and MSL14 among the first to sixth mesh lines MSL11 to MSL16 may be relatively close to the center of the unit mesh pattern UN-1, and the ninth and tenth mesh lines MSL23 and MSL24 among the seventh to twelfth mesh lines MSL21 to MSL26 may be relatively close to the center of the unit mesh pattern UN-1. The central opening OP11 may be defined by the third and fourth mesh lines MSL13 and MSL14 and the ninth and tenth mesh lines MSL23 and MSL24 that intersect the third and fourth mesh lines MSL13 and MSL14.

Meanwhile, the third, fourth, ninth, and tenth mesh lines MSL13, MSL14, MSL23, and MSL24 defining the central opening OP11 may define a predetermined sub-mesh pattern. The sub-mesh pattern defined by the third, fourth, ninth, and tenth mesh lines MSL13, MSL14, MSL23, and MSL24 may be substantially the same as the first sub-mesh pattern 10 illustrated in FIG. 5B, and thus detailed descriptions thereof are omitted.

The first peripheral openings OP21_a, OP21_b, and OP21_c may be arranged along an edge of the central opening OP11. The first peripheral openings OP21_a, OP21_b, and OP21_c may be defined by the intersection of the second to fifth mesh lines MSL12 to MSL15 among the first to sixth mesh lines MSL11 to MSL16 and the eighth to eleventh mesh lines MSL22 to MSL25 among the seventh to twelfth mesh lines MSL21 to MSL26.

The first peripheral openings OP21_a, OP21_b, and OP21_c are adjacent to four sides and four vertexes of the central opening OP11, respectively. In FIG. 6A, three openings OP21_a, OP21_b, and OP21_c among the first peripheral openings are represented as an example by dotted lines.

Meanwhile, the second to fifth and eighth to eleventh mesh lines MSL12 to MSL15 and MSL22 to MSL25 defining the first peripheral openings OP21_a, OP21_b, and OP21_c may define a predetermined sub-mesh pattern. The sub-mesh pattern defined by the second to fifth and eighth to eleventh mesh lines MSL12 to MSL15 and MSL22 to MSL25 may be substantially the same as the second sub-mesh pattern 20 illustrated in FIG. 5C, and thus detailed descriptions thereof are omitted.

The second peripheral openings OP30_a, OP30_b, and OP30_c may be arranged along outer edges of the first peripheral openings OP21_a, OP21_b, and OP21_c. In other words, the second peripheral openings OP30_a, OP30_b, and OP30_c may be arranged along an edge of the sub-mesh pattern including the first peripheral openings OP21_a, OP21_b, and OP21_c.

The second peripheral openings OP30_a, OP30_b, and OP30_c may be defined by the intersection of the first to sixth mesh lines MSL11, MSL12, MSL13, MSL14, MSL15, and MSL16 and the seventh to twelfth mesh lines MSL21, MSL22, MSL23, MSL24, MSL25, and MSL26. For the purpose of ease and convenience in description and illumination, FIG. 6B illustrates a third sub-mesh pattern 30 in which the second peripheral openings OP30_a, OP30_b, and OP30_c are disposed.

As illustrated in FIGS. 6A and 6B, the third sub-mesh pattern 30 may be a pattern in which the second peripheral openings OP30_a, OP30_b, and OP30_c are defined. The third sub-mesh pattern 30 may have a quadrilateral frame shape that surrounds the sub-mesh pattern in which the first peripheral openings OP21_a, OP21_b, and OP21_c are defined.

The quadrilateral frame shape corresponding to an outward shape of the third sub-mesh pattern 30 may be defined by the first, second, fifth, and sixth mesh lines MSL11, MSL12, MSL15, and MSL16, disposed relatively outside, among the first to sixth mesh lines MSL11 to MSL16 and the seventh, eighth, eleventh, and twelfth mesh lines MSL21, MSL22, MSL25, and MSL26, disposed relatively outside, among the seventh to twelfth mesh lines MSL21 to MSL26.

In more detail, portions of the second, fifth, eighth, and eleventh mesh lines MSL12, MSL15, MSL22, and MSL25 may define inner sides of the quadrilateral frame shape of the third sub-mesh pattern 30, and portions of the first, sixth, seventh, and twelfth mesh lines MSL11, MSL16, MSL21, and MSL26 may define outer sides of the quadrilateral frame shape of the third sub-mesh pattern 30. The second, fifth, eighth, and eleventh mesh lines MSL12, MSL15, MSL22, and MSL25 may also define outer sides of the sub-mesh pattern in which the first peripheral openings OP21_a, OP21_b, and OP21_c are defined.

The first to sixth mesh lines MSL11, MSL12, MSL13, MSL14, MSL15, and MSL16 and the seventh to twelfth mesh lines MSL21, MSL22, MSL23, MSL24, MSL25, and MSL26 may intersect the quadrilateral frame shape corresponding to the outward shape of the third sub-mesh pattern 30, thereby defining the second peripheral openings OP30_a, OP30_b, and OP30_c. The second peripheral openings OP30_a, OP30_b, and OP30_c may be defined in the third sub-mesh pattern 30.

On the other hand, the third sub-mesh pattern 30 may include a plurality of cutting lines CT2_a, CT2_b, CT2_c, CT2_d, CT2_e, CT2_f, CT2_g, and CT2_h. Each of the cutting lines CT2_a, CT2_b, CT2_c, CT2_d, CT2_e, CT2_f, CT2_g, and CT2_h may be an imaginary line cutting a portion of the mesh line and may have a line shape that links centers of two second peripheral openings adjacent to each other with a predetermined mesh line interposed therebetween.

Each of the cutting lines CT2_a, CT2_b, CT2_c, CT2_d, CT2_e, CT2_f, CT2g, and CT2_h may cut the mesh line to connect or open the two second peripheral openings adjacent to each other. Thus, some openings of the second peripheral openings OP30_a, OP30_b, and OP30_c may be connected or opened to each other through the cutting portion TS-CP.

The cutting lines CT2_a, CT2_b, CT2_c, CT2_d, CT2_e, CT2_f, CT2_g, and CT2_h may be arranged along the frame shape. In addition, each of the cutting lines CT2_a, CT2_b, CT2_c, CT2_d, CT2_e, CT2_f, CT2g, and CT2_h may extend in parallel to the outer side adjacent thereto in the third sub-mesh pattern 30.

Thus, first, fourth, fifth, and eighth cutting lines CT2_a, CT2_d, CT2_e, and CT2_h adjacent to the outer sides defined by the first and sixth mesh lines MSL11 and MSL16 may extend in the fourth direction D4, and second, third, sixth, and seventh cutting lines CT2_b, CT2_c, CT2_f, and CT2_g adjacent to the outer sides defined by the seventh and twelfth mesh lines MSL21 and MSL26 may extend in the fifth direction D5.

The cutting lines CT2_a, CT2_b, CT2_c, CT2_d, CT2_e, CT2_f, CT2_g, and CT2_h may have arrangement that substantially corresponds to the arrangement of the cutting lines in the second sub-mesh pattern 20 illustrated in FIG. 5C. Thus, detailed descriptions to the cutting lines CT2_a to CT2_h are omitted.

The unit mesh pattern UN-1 according to an embodiment of the present disclosure may include 25 openings. However, the electronic device according to an embodiment of the present disclosure may include the mesh patterns having various numbers may not be limited to the unit mesh pattern having a specific number.

In addition, since the electronic device according to an embodiment of the present disclosure includes a plurality of the unit mesh patterns UN-1 improving the visibility of the electronic device. This will be described later in more detail.

Figure 7A:
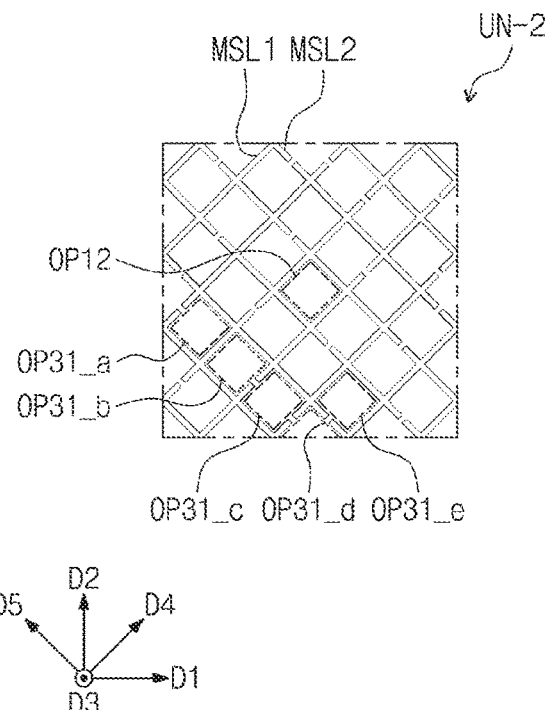
FIGS. 7A, 7B, 7C, 7D, 7E and 7F are plan views related to a unit mesh pattern according to an embodiment of the present disclosure.
Figure 7B:
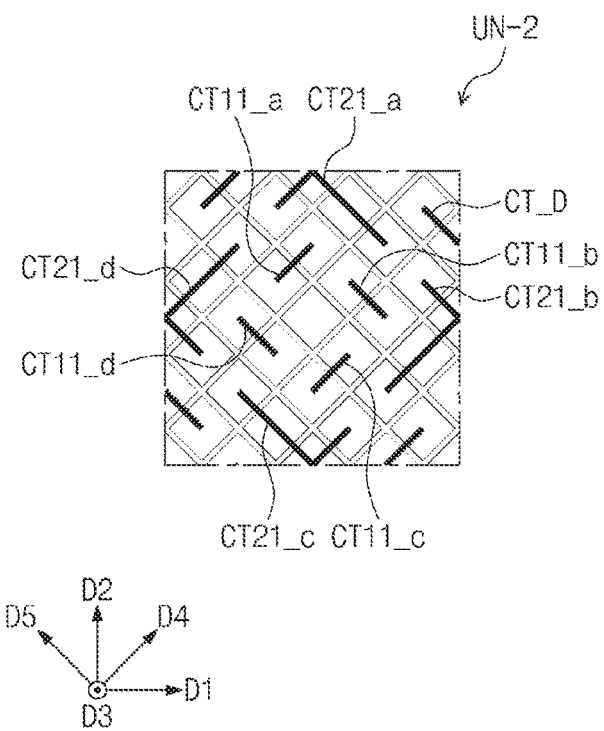
Figure 7C:
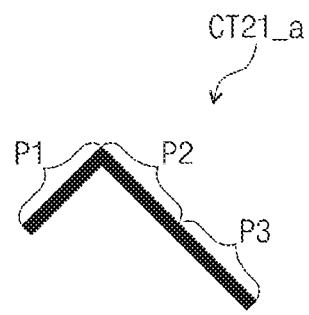
Figure 7D:
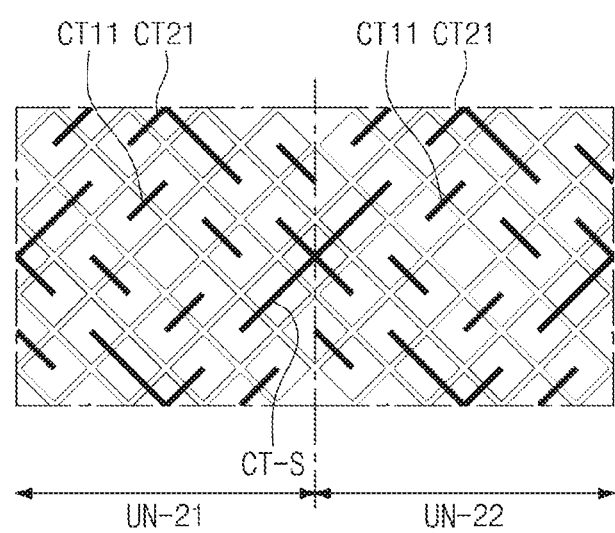
Figure 7D:
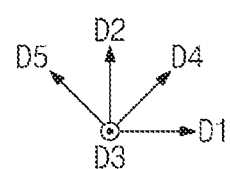
Figure 7E:
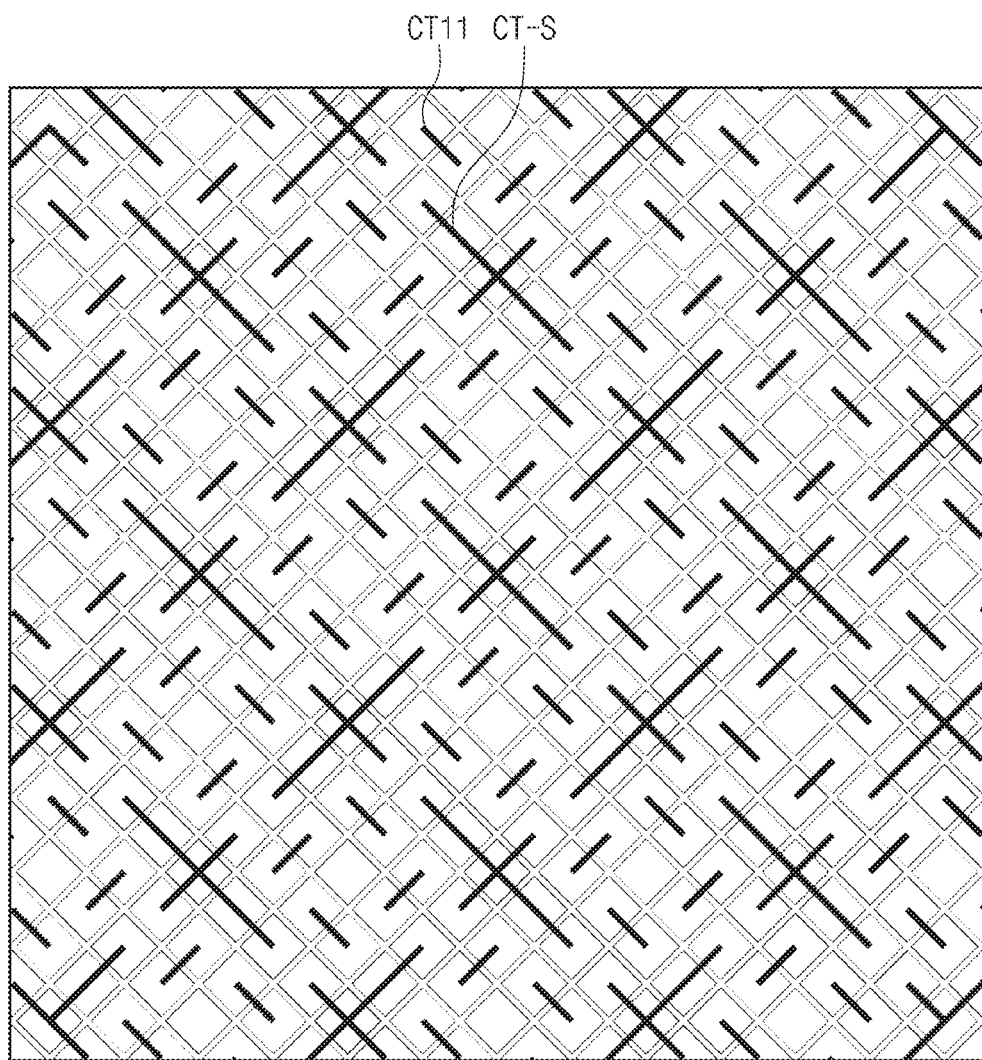
Figure 7F:
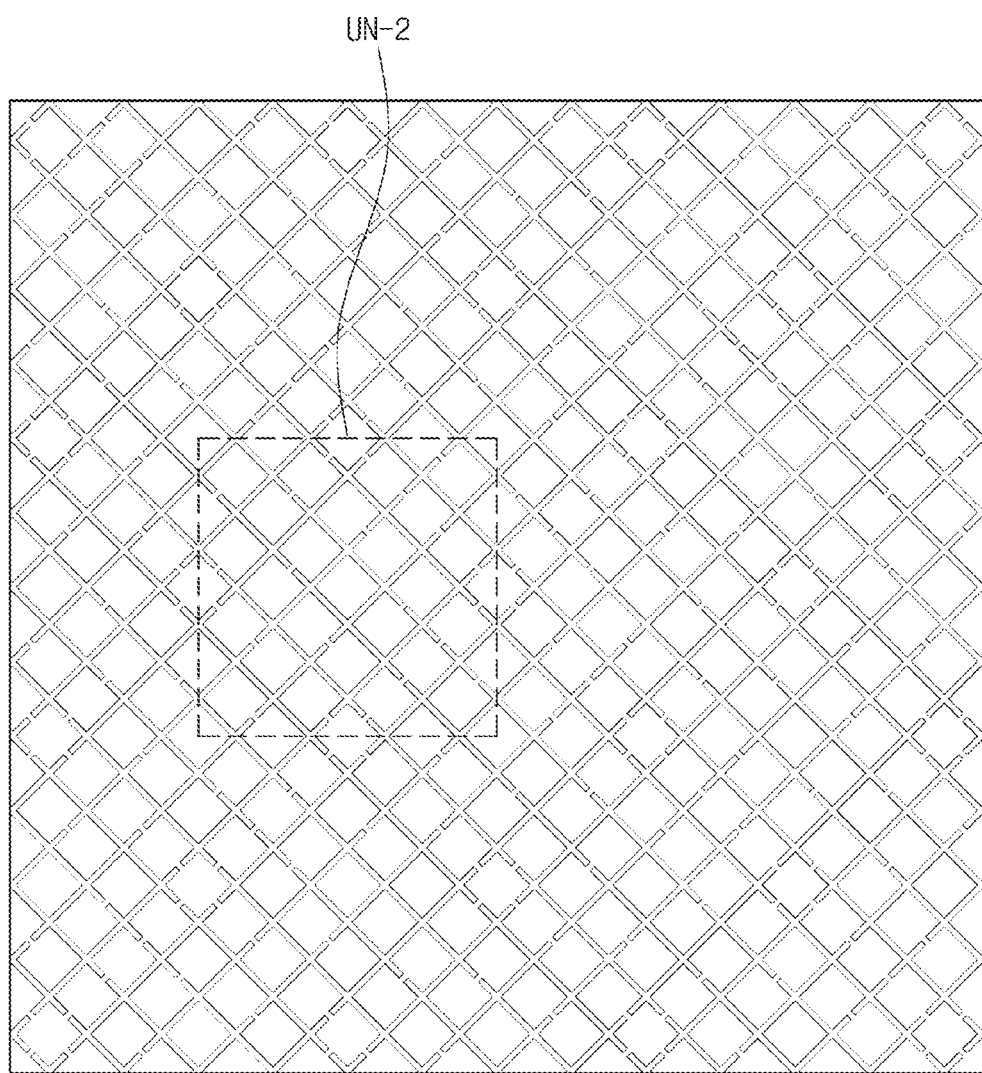

FIGS. 7A to 7F are plan views related to a unit mesh pattern according to an embodiment of the present disclosure. FIGS. 7A and 7B are plan views illustrating a unit mesh pattern UN-2 according to an embodiment of the present disclosure, and FIG. 7C is a plan view illustrating one of the cutting lines illustrated in FIG. 7B. FIGS. 7D to 7F are plan views illustrating a portion of a sensing pattern in which the unit mesh pattern UN-2 of FIGS. 7A and 7B is provided in plurality. Hereinafter, an electronic device according to an embodiment of the present disclosure will be described with reference to FIGS. 7A to 7F.

FIG. 7A illustrates a partial area, corresponding to a unit mesh pattern UN-2, of the first and second sensing patterns SP1 and SP2 illustrated in FIG. 2A. Each of the first sensing patterns SP1 and the second sensing patterns SP2 may have a shape in which the unit mesh patterns UN-2 are continuously arranged.

Referring to FIG. 7A, the unit mesh pattern UN-2 is illustrated as a portion cut by a quadrilateral (or square) shape defined by the first direction D1 and the second direction D2. As illustrated in FIG. 7A, the unit mesh pattern UN-2 may have a shape different from the diamond shape defined by the fourth and fifth directions D4 and D5. However, embodiments of the present disclosure are not limited to a particular shape.

The unit mesh pattern UN-2 may be defined by 16 mesh lines intersecting each other. In more detail, the unit mesh pattern UN-2 may be defined by eight first mesh lines MSL1 extending in the fourth direction D4 in parallel to each other and eight second mesh lines MSL2 extending in the fifth direction D5 to intersect the eight first mesh lines MSL1.

The unit mesh pattern UN-2 may include a plurality of openings. The openings may include a central opening OP12 and peripheral openings disposed outside the central opening OP12. Adjacent ones of the peripheral openings may be connected or opened to each other. The peripheral openings may include first peripheral openings arranged along an edge of the central opening OP12, and second peripheral openings arranged along an edge of a sub-mesh pattern in which the first peripheral openings are defined.

The central opening OP12 may be disposed at a center of the unit mesh pattern UN-2. The central opening OP12 may substantially correspond to the central opening OP10 illustrated in FIG. 5B, and the first sub-mesh pattern 10 of FIG. 5B may be included in the unit mesh pattern UN-2 even though a reference designator for the first sub-mesh pattern 10 is not shown in FIG. 7A.

The first peripheral openings surrounding the central opening OP12 may substantially correspond to the peripheral openings OP20_a, OP20_b, and OP20_c illustrated in FIGS. 5A and 5C. Thus, even though reference designators for the peripheral openings OP20_a, OP20_b, and OP20_c are not shown in FIG. 7A, the first peripheral openings and the second sub-mesh pattern 20 (see FIG. 5B) in which the first peripheral openings are defined may be included in the unit mesh pattern UN-2.

As described above, the second sub-mesh pattern 20 in which the first peripheral openings are defined may include a plurality of first cutting lines CT11_a, CT11_b, CT11_c, and CT11_d. In FIG. 7B, the first cutting lines CT11_a, CT11_b, CT11_c, and CT11_d are shown as dark lines. Adjacent two of the first peripheral openings may be connected or opened to each other through a cutting portion defined by each of the first cutting lines CT11_a, CT11_b, CT11_c, and CT11_d.

The first cutting lines CT11_a, CT11_b, CT11_c, and CT11_d have substantially the same shapes as the cutting lines CT1_a, CT1_b, CT1_c, and CT1_d illustrated in FIG. 5C. However, it is noted that arrangement positions of the first cutting lines CT11_a, CT11_b, CT11_c, and CT11_d may be different from the arrangement positions of the cutting lines CT1_a, CT1_b, CT1_c, and CT1_d illustrated in FIG. 5C.

For example, the arrangement of the first cutting lines CT11_a, CT11_b, CT11_c, and CT11_d may correspond to arrangement in which the cutting lines CT1_a, CT1_b, CT1_c, and CT1_d of FIG. 5C are shifted with respect to the central opening OP10 (see FIG. 5A) in a counterclockwise direction by a width of the peripheral opening. Thus, in FIG. 7B, the first cutting lines CT11_a, CT11_b, CT11_c, and CT11_d may cut the mesh lines corresponding to the mesh lines that are not cut in the first sub-mesh pattern 20 of FIG. 5C.

However, the arrangement of the first cutting lines CT11_a, CT11_b, CT11_c, and CT11_d illustrated in FIG. 7C is an example. In certain embodiments, the first cutting lines CT11_a, CT11_b, CT11_c, and CT11_d of FIG. 7B may be disposed at the same positions of the cutting lines CT1_a, CT1_b, CT1_c, and CT1_d of FIG. 5C, respectively. However, embodiments of the present disclosure are not limited thereto.

The second peripheral openings may be arranged along an edge of the second sub-mesh pattern 20 in which the first peripheral openings are defined. For the purpose of ease and convenience in description and illumination, first to fifth openings OP31_a, OP31_b, OP31_c, OP31_d, and OP31_e among the second peripheral openings are represented by dotted lines in FIG. 7A. However, these are illustrated as an example. The following descriptions to the first to fifth openings OP31_a, OP31_b, OP31_c, OP31_d, and OP31_e may be applied in common to others second peripheral openings.

The first to fifth openings OP31_a, OP31_b, OP31_c, OP31_d, and OP31_e may be sequentially arranged around the central opening OP12 in a counterclockwise direction. At least one of the first to fifth openings OP31_a, OP31_b, OP31_c, OP31_d, and OP31_e may be partially illustrated in the unit mesh pattern UN-2.

In the present embodiment, the fourth opening OP31_d may be defined as an opening having an incomplete shape in the unit mesh pattern UN-2. The fourth opening OP31_d may be surrounded by two intersecting mesh lines MSL1 and MSL2 and a quadrilateral boundary of the unit mesh pattern UN-2. Thus, the fourth opening OP31_d may have a triangular shape. Even though not shown in FIG. 7A, the fourth opening OP31_d may be connected to an opening of another unit mesh pattern UN-2 to be defined as a quadrilateral opening.

The second peripheral openings including the first to fifth openings OP31_a, OP31_b, OP31_c, OP31_d, and OP31_e may define a predetermined sub-mesh pattern that has a quadrilateral frame shape surrounding the edge of the sub-mesh pattern in which the first peripheral openings are defined. Hereinafter, the reference designators OP31_a, OP31_b, OP31_c, OP31_d, and OP31_e will be used as both the reference designators of the second peripheral openings and the reference designators of the first to fifth openings.

The shape of the sub-mesh pattern in which the second peripheral openings OP31_a, OP31_b, OP31_c, OP31_d, and OP31_e are defined may be substantially the same as the shape of the third sub-mesh pattern 30 illustrated in FIG. 6B. However, shapes and/or arrangement of cutting lines and cutting portions in the sub-mesh pattern according to the present embodiment may be different from those of the cutting lines and the cutting portions in the third sub-mesh pattern 30 of FIG. 6B.

In detail, referring to FIGS. 7A and 7B, a plurality of second cutting lines CT21_a, CT21_b, CT21_c, and CT21_d are defined in the sub-mesh pattern having the second peripheral openings OP31_a, OP31_b, OP31_c, OP31_d, and OP31_e. Each of the second cutting lines CT21_a, CT21_b, CT21_c, CT21_d are shown as a combination of dark lines in FIG. 7B.

Shapes of the second cutting lines CT21_a, CT21_b, CT21_c, and CT21_d are different from those of the first cutting lines CT11_a, CT11_b, CT11_c, and CT11_d. Thus, in the unit mesh pattern UN-2, arrangement of the cutting portions formed in the sub-mesh pattern having the second peripheral openings is different from the arrangement of the cutting portions formed in the sub-mesh pattern having the first peripheral openings.

FIG. 7C illustrates the second cutting line CT21_a of the second cutting lines CT21_a, CT21_b, CT21_c, and CT21_d. As illustrated in FIG. 7C, the second cutting line CT21_a may include first, second, and third portions P1, P2, and P3.

Each of the first to third portions P1, P2, and P3 may be a line that links centers of two adjacent openings. Thus, each of the first to third portions P1, P2, and P3 may have substantially the same shape as each of the first cutting lines CT11_a, CT11_b, CT11_c, and CT11_d. In addition, each of the second cutting line CT21_a may substantially correspond to three first cutting lines that are connected to each other.

At least two of the first to third portions P1, P2, and P3 may extend in directions different from each other. In the present embodiment, an extending direction of the first portion P1 is different from an extending direction of each of the second and third portions P2 and P3. The second portion P2 is connected between the first portion P1 and the third portion P3. Thus, the second cutting line CT21_a may have a "¬" shape having a bent portion.

Referring again to FIGS. 7A and 7B, the second cutting lines CT21_a, CT21_b, CT21_c, and CT21_d are arranged around the central opening OP12 in a clockwise direction. Adjacent two of the second cutting lines CT21_a, CT21_b, CT21_c, and CT21_d are spaced apart from each other with one mesh line interposed therebetween.

Thus, each of four second peripheral openings overlapping with each of the second cutting lines CT21_a to CT21_d can be connected or opened to one(s), adjacent thereto, of the corresponding four second peripheral openings. In the present embodiment, each of the second cutting lines CT21_a, CT21_b, CT21_c, and CT21_d connects or opens the four second peripheral openings to each other.

The second to fifth openings OP31_b, OP31_c, OP31_d, and OP31_e among the second peripheral openings may be opened and connected to each other by one second cutting line CT21_c. The first opening OP31_a of the first to fifth openings OP31_a to OP31_e is opened and connected to another second peripheral opening adjacent thereto by another second cutting line CT21_d.

Since lengths of the second cutting lines CT21_a to CT21_d are longer than those of the first cutting lines CT11_a to CT11_d, the second cutting lines CT21_a to CT21_d may induce continuous arrangement of the cutting portions. Thus, it is possible to increase similarity between the cutting portion and the boundary of a sensor (e.g., the sensing pattern) in which the cutting portions of the mesh lines are continuously formed. As a result, it is difficult to distinguish between the boundary of the sensor and the inside of the sensor, thereby improving the visibility of the electronic device.

On the other hand, the unit mesh pattern UN-2 may further include third peripheral openings disposed outside the second peripheral openings OP31_a, OP31_b, OP31_c, OP31_d, and OP31_e. In the present embodiment, the third peripheral openings may include one diamond-shaped opening and three triangular openings that are disposed adjacent to each of vertexes of the quadrilateral shape of the unit mesh pattern UN-2. However, embodiments of the present disclosure are not limited thereto. In certain embodiments, the arrangement and shapes of the third peripheral openings may be variously modified depending on the size and shape of the unit mesh pattern UN-2.

Dummy cutting lines CT_D may be defined in the third peripheral openings. Each of the dummy cutting lines CT_D may have the same shape as each of the first cutting lines CT11_a, CT11_b, CT11_c, and CT11_d. In addition, each of the dummy cutting lines CT_D may be parallel to a corresponding one of the first cutting lines CT11_a, CT11_b, CT11_c, and CT11_d. The dummy cutting line CT_D and the first cutting line CT11_a, CT11_b, CT11_c, or CT11_d corresponding to each other may cut the same mesh line.

For example, another portion of the mesh line MSL1 that is cut by one (e.g., CT11_b) of the first cutting lines CT11_a to CT11_d may be cut by the dummy cutting line CT_D parallel to the first cutting line CT11_b. However, this is illustrated as an example, and embodiments of the present disclosure are not limited thereto. In certain embodiments, the shapes and arrangement of the dummy cutting lines included in the unit mesh pattern UN-2 may be variously modified.

Referring to FIGS. 7D to 7F, a sensing pattern including a plurality of the unit mesh patterns UN-2 is illustrated. FIG. 7D illustrates a first unit mesh pattern UN-21 and a second unit mesh pattern UN-22 that are connected to each other in the first direction D1.

Each of the first and second unit mesh patterns UN-21 and UN-22 may be substantially the same as the unit mesh pattern UN-2 illustrated in FIGS. 7A and 7B. First cutting lines CT11 illustrated in each of the first and second unit mesh patterns UN-21 and UN-22 may correspond to the first cutting lines CT11_a, CT11_b, CT11_c, and CT11_d illustrated in FIG. 7B, and second cutting lines CT21 illustrated in each of the first and second unit mesh patterns UN-21 and UN-22 may correspond to the second cutting lines CT21_a, CT21_b, CT21_c, and CT21_d illustrated in 7B.

According to one embodiment, the second cutting lines CT21 may be a connection point of adjacent unit mesh patterns. As illustrated in FIG. 7D, the second unit mesh pattern UN-22 is disposed adjacent to a side of the first unit mesh pattern UN-21 in the first direction D1, and thus a second cutting line of the first unit mesh pattern UN-21 that is adjacent to the side in the first direction D1 may be connected to another second cutting line of the second unit mesh pattern UN-22.

Thus, two second cutting lines CT21 may be connected to each other at a boundary between the first and second unit mesh patterns UN-21 and UN-22 to form a new combination cutting line CT-S. The combination cutting line CT-S may include a first line extending in the fifth direction D5 to open three openings, and a second line extending in the fourth direction D4 to open five openings. The first line intersects the second line.

FIGS. 7E and 7F illustrate sensing patterns in which two or more mesh patterns UN-2 are arranged to correspond to the arrangement illustrated in FIG. 7D. As illustrated in FIG. 7E, the first cutting lines CT11 may be arranged to surround each of the central openings.

As described above, each of the second cutting lines CT21 (see FIG. 7D) may function as a connection point at which adjacent unit mesh patterns UN-2 are connected to each other. Thus, the combination cutting lines CT-S are shown in the sensing pattern in which a plurality of unit mesh patterns UN-2 are connected to each other. As a result, the sensing pattern may include a plurality of cutting portions formed by the first cutting lines CT11 and the combination cutting lines CT-S.

Since the electronic device according to an embodiment of the present disclosure includes the unit mesh patterns in which various cutting lines are defined, the sensing pattern including the cutting portions that are arranged in various forms may be provided in the electronic device. As a result, it is possible to effectively prevent a problem that the sensing pattern is visible to a user.

Figure 8A:
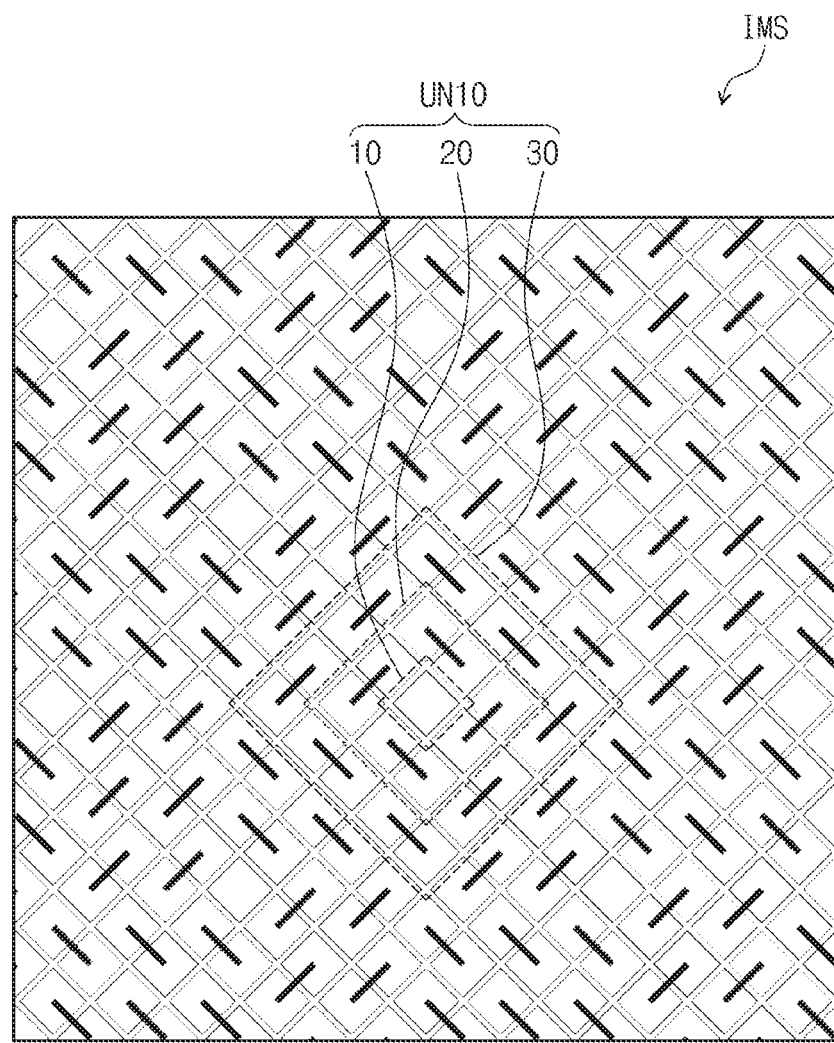
FIGS. 8A, 8B and 8C are plan views illustrating a method of manufacturing an electronic device, according to an embodiment of the present disclosure.
Figure 8B:
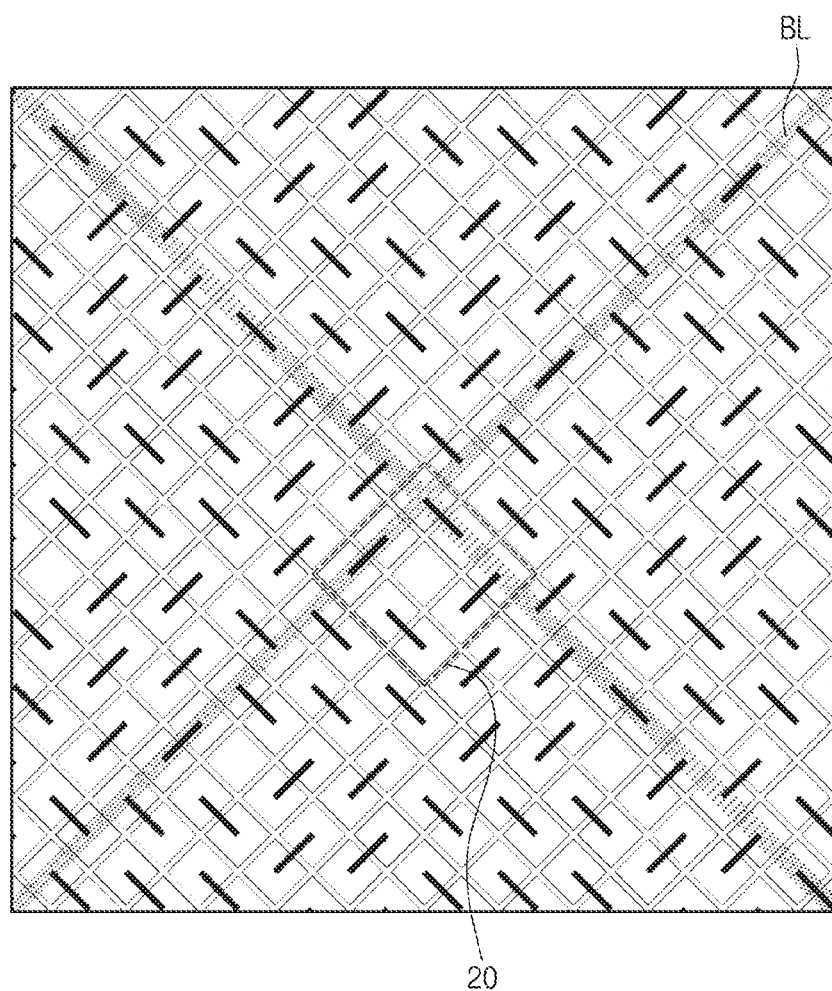
Figure 8C:
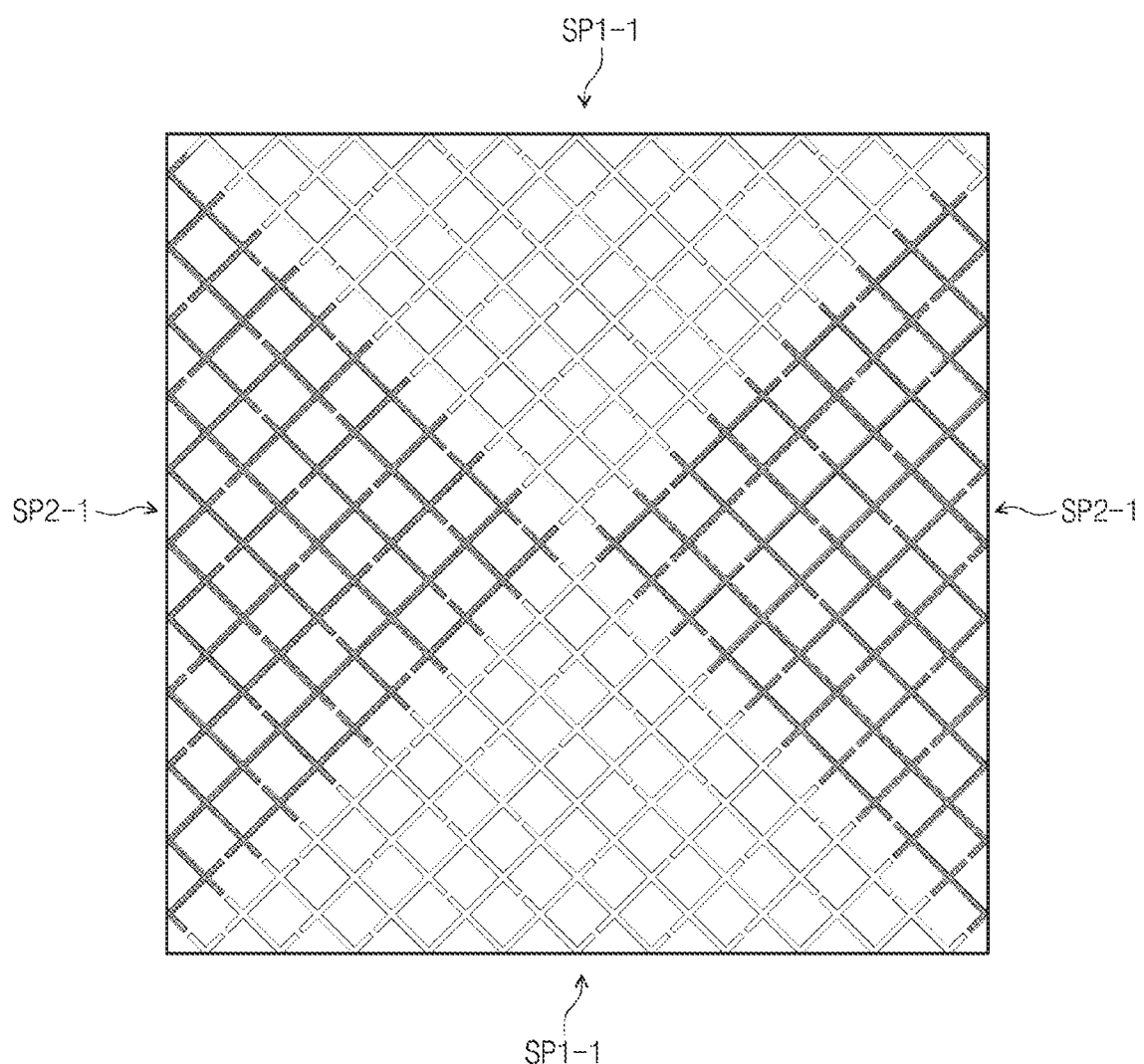

FIGS. 8A to 8C are plan views illustrating a method of manufacturing an electronic device, according to an embodiment of the present disclosure. FIGS. 8A to 8C illustrate substantially the same area. In FIGS. 8A and 8B, cutting lines are represented by dark lines to distinguish the cutting lines from mesh lines. In addition, in FIG. 8C, some of the mesh lines are shaded to distinguish the sensing patterns from each other.

Hereinafter, a method of manufacturing an electronic device according to an embodiment of the present disclosure will be described with reference to FIGS. 8A to 8C. In addition, the same elements as described with reference to FIGS. 1 to 7F will indicated by the same reference numerals or designators, and the descriptions thereof will be omitted or mentioned briefly for the purpose of ease and convenience in description and illumination.

A partial area of an initial mesh substrate IMS is illustrated in FIGS. 8A and 8B. The initial mesh substrate IMS according to an embodiment of the present disclosure may include a plurality of mesh lines intersecting each other and a plurality of cutting lines. As described above, the cutting lines partially cut the mesh lines. Thus, the mesh lines of the initial mesh substrate IMS may be a single conductive pattern and may be electrically connected to each other.

As illustrated in FIG. 8A, the initial mesh substrate IMS is provided. The initial mesh substrate IMS may include a plurality of unit mesh patterns UN10. The unit mesh patterns UN10 may be repeatedly and continuously arranged. One of the plurality of unit mesh patterns UN10 is represented by the reference designator UN10 in FIG. 8A.

The unit mesh pattern UN10 may include a first sub-mesh pattern 10, a second sub-mesh pattern 20, and a third sub-mesh pattern 30. The second sub-mesh pattern 20 may have a quadrilateral frame shape surrounding an edge of the first sub-mesh pattern 10, and the third sub-mesh pattern 30 may have a quadrilateral frame shape surrounding an outer edge of the second sub-mesh pattern 20.

In the present embodiment, the unit mesh pattern UN10 may be substantially the same as the unit mesh pattern UN-1 illustrated in FIG. 6A. Thus, the first sub-mesh pattern 10 may substantially correspond to the first sub-mesh pattern 10 illustrated in FIG. 5B, the second sub-mesh pattern 20 may substantially correspond to the second sub-mesh pattern 20 illustrated in FIG. 5C, and the third sub-mesh pattern 30 may substantially correspond to the third sub-mesh pattern 30 illustrated in FIG. 6B.

Likewise, the plurality of cutting lines illustrated in FIGS. 8A and 8B may substantially the same as the cutting lines $CT1\_a$, $CT1\_b$, $CT1\_c$, and $CT1\_d$ illustrated in FIG. 5C and the cutting lines $CT2\_a$, $CT2\_b$, $CT2\_c$, $CT2\_d$, $CT2\_e$, $CT2\_f$, $CT2\_g$, and $CT2\_h$ illustrated in FIG. 6B. Thus, detailed descriptions thereof are omitted.

Thereafter, as illustrated in FIG. 8B, a boundary line BL is formed on the initial mesh substrate IMS. In FIG. 8B, the boundary line BL is shaded to distinguish the boundary line BL from the cutting lines. Some of the cutting lines may be connected to each other to form the boundary line BL. The boundary line BL formed by connecting some of the cutting lines of the second sub-mesh patterns 20 of the unit mesh patterns UN10 is illustrated as an example in FIG. 8B.

The mesh lines overlapping with the boundary line BL may be additionally cut along the boundary line BL, and thus a plurality of first sensing patterns SP1-1 and a plurality of second sensing patterns SP2-1 may be formed as illustrated in FIG. 8C. The first sensing patterns SP1-1 and the second sensing patterns SP2-1 are distinguished from each other by different shades in FIG. 8C. The first sensing patterns SP1-1 and the second sensing patterns SP2-1 are spaced apart from each other by the boundary line BL and are electrically insulated from each other.

Since the boundary line BL is defined as a diagonal shape passing the cutting lines of the second sub-mesh pattern 20 in the present embodiment, the first and second sensing patterns SP1-1 and SP2-1 illustrated in FIG. 8C are formed. However, these are illustrated as an example, and embodiments of the present disclosure are not limited thereto. In certain embodiments, the shapes of the first and second sensing patterns SP1-1 and SP2-1 may be variously modified, and the shape of the boundary line BL may also be variously modified. For example, the boundary line BL may have a zigzag shape.

A plurality of the cutting portions may be defined in each of the first and second sensing patterns SP1-1 and SP2-1. The cutting portions may function optical compensation patterns that reduce a difference in light reflectance between a boundary area between the first and second sensing patterns SP1-1 and SP2-1 and the inside of each of the first and second sensing patterns SP1-1 and SP2-1.

Thus, it is difficult for a user to sense a difference between the inside of each of the first and second sensing patterns SP1-1 and SP2-1 and the boundary area between the first and second sensing patterns SP1-1 and SP2-1. As a result, a problem that the first and second sensing patterns SP1-1 and SP2-1 are visible to a user may be solved or improved.

On the other hand, even though not shown in the drawings, the boundary line BL may be provided in plurality, and thus dummy patterns may be formed between the first sensing patterns SP1-1 and the second sensing patterns SP2-1. According to an embodiment of the present disclosure, even though the dummy patterns are formed, the cutting portions formed by the cutting lines may also be formed in the dummy patterns since the dummy patterns are formed through the initial mesh substrate IMS.

As a result, the inside of the dummy pattern, an interval between the dummy and sensing patterns, and the inside of the sensing pattern include the cutting portions that are formed by the cutting lines having substantially the same regularity, and thus poor visibility of the electronic device is solved or improved without an additional layer or pattern for optical compensation.

In the method of manufacturing the electronic device according to an embodiment of the present disclosure, the initial mesh substrate IMS on which the cutting lines are defined may be provided, and the boundary line BL may be formed by connecting desired cutting lines among the cutting lines. Various-shaped sensing patterns required by a user may be formed by the combination of the cutting lines that can be variously arranged and correspond to extending directions of the mesh lines.

In addition, the cutting lines that are not included in the boundary line BL in the initial mesh substrate IMS remain in the sensing pattern. The cutting lines remaining in the sensing pattern may control the sensing pattern in such a way that light reflectance in the sensing pattern becomes similar to light reflectance at a boundary of the sensing pattern by optical compensation. Thus, it is difficult to distinguish between the boundary line BL and the inside of the sensing pattern, thereby improving the visibility of the electronic device.

Furthermore, in the method of manufacturing the electronic device according to an embodiment of the present disclosure, the initial mesh substrate IMS may be provided to form a sensor including an optical compensation pattern by only the process of forming the boundary line BL. Thus, a process of designing an optical compensation pattern can be omitted to simplify manufacturing processes while reducing a process cost.

Figure 9A:
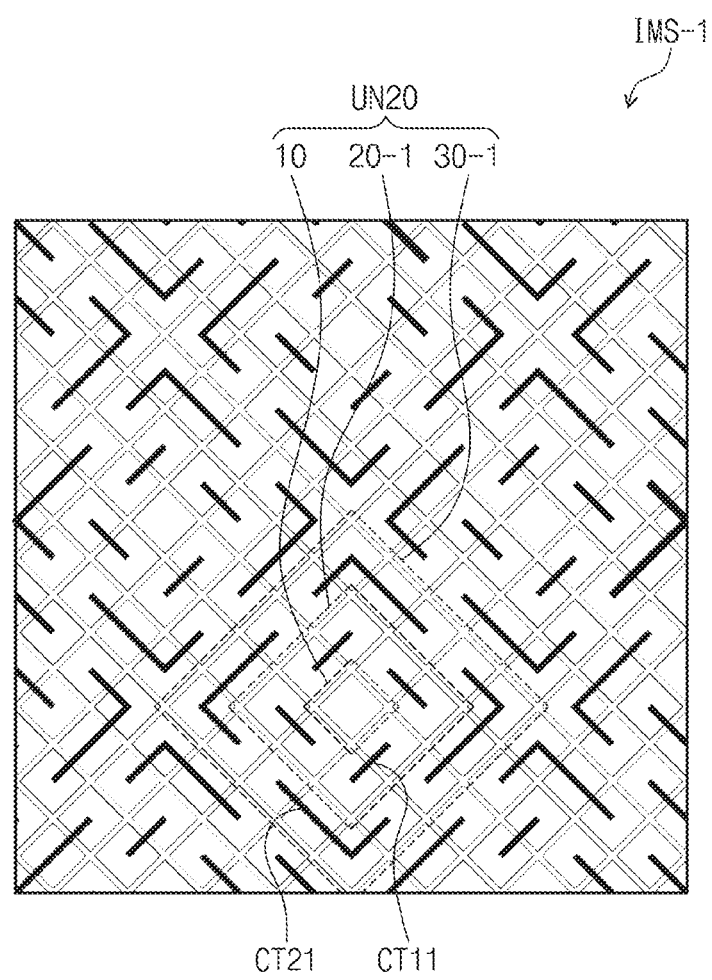
FIGS. 9A, 9B and 9C are plan views illustrating a method of manufacturing an electronic device, according to an embodiment of the present disclosure.
Figure 9B:
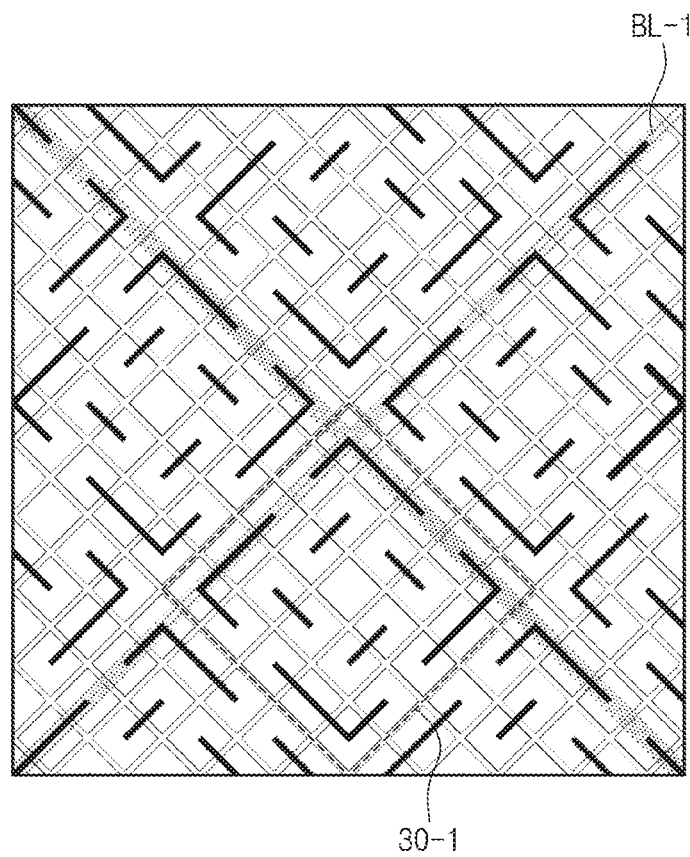
Figure 9C:
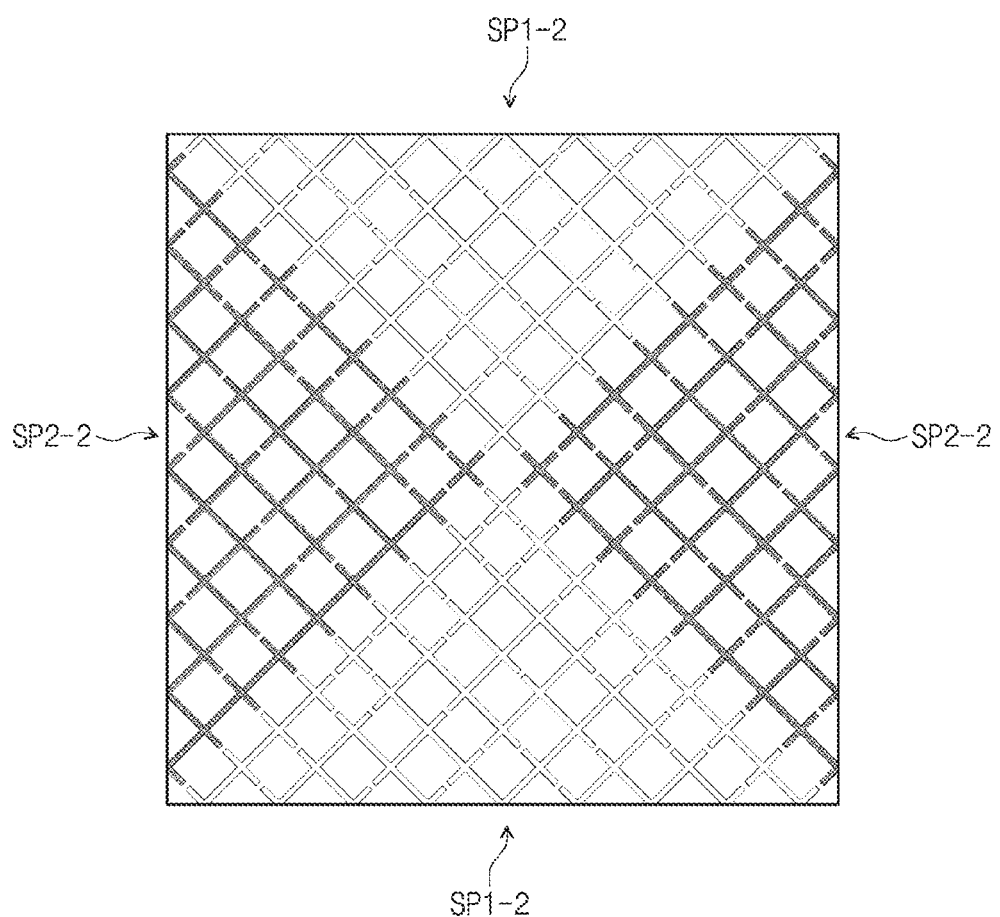

FIGS. 9A to 9C are plan views illustrating a method of manufacturing an electronic device, according to an embodiment of the present disclosure. FIGS. 9A to 9C illustrate substantially the same area. In FIGS. 9A and 9B, cutting lines are represented by dark lines to distinguish the cutting lines from mesh lines. In addition, in FIG. 9C, some of the mesh lines are shaded to distinguish the sensing patterns from each other.

FIGS. 9A and 9B illustrate a partial area of an initial mesh substrate IMS-1, and FIG. 9C illustrates a partial area of an electronic device. Hereinafter, a method of manufacturing an electronic device according to an embodiment of the present disclosure will be described with reference to FIGS. 9A to 9C. In addition, the same elements as described with reference to FIGS. 1 to 8C will indicated by the same reference numerals or designators, and the descriptions thereof will be omitted or mentioned briefly for the purpose of ease and convenience in description and illumination.

As illustrated in FIG. 9A, the initial mesh substrate IMS-1 is provided. The initial mesh substrate IMS-1 may include a plurality of unit mesh patterns UN20. The unit mesh patterns UN20 may be repeatedly and continuously arranged. One of the plurality of unit mesh patterns UN20 is represented by the reference designator UN20 in FIG. 9A.

The unit mesh pattern UN20 may include a first sub-mesh pattern 10, a second sub-mesh pattern 20-1, and a third sub-mesh pattern 30-1. In the present embodiment, the unit mesh pattern UN20 may partially correspond to the unit mesh pattern UN-2 illustrated in FIG. 7A.

The unit mesh pattern UN20 may correspond to the unit mesh pattern UN-2 of FIG. 7A, except for the areas in which the dummy cutting lines CT_D are defined in FIG. 7A. Thus, first cutting lines CT11 defined in the second sub-mesh pattern 20-1 of the unit mesh pattern UN20 may substantially correspond to the first cutting lines CT11_a, CT11_b, CT11_c, and CT11_d illustrated in FIG. 7B, and second cutting lines CT21 defined in the third sub-mesh pattern 30-1 may substantially correspond to the second cutting lines CT21_a, CT21_b, CT21_c, and CT21_d illustrated in 7B.

In the present embodiment, the unit mesh patterns UN20 may be arranged using the mesh lines, defining a boundary of each unit mesh pattern UN20, as boundary lines. Thus, even though the unit mesh pattern UN20 includes the first to third sub-mesh patterns 10, 20-1, and 30-1 that are the same as those of the unit mesh pattern UN-2 illustrated in FIG. 7A, the sensing pattern different from the sensing pattern of FIG. 7D may be formed on the initial mesh substrate IMS-1. The shapes of the mesh patterns of the electronic device according to an embodiment of the present disclosure may be variously modified depending on the shapes and/or arrangement of the cutting lines and the arrangement of the unit mesh patterns, and thus embodiments of the present disclosure are not limited to a specific one of the various shapes of the mesh patterns.

Thereafter, as illustrated in FIGS. 9B and 9C, a boundary line BL-1 may be formed on the initial mesh substrate IMS-1 to form a plurality of first sensing patterns SP1-2 and a plurality of second sensing patterns SP2-2. As described above, the boundary line BL-1 may be formed by connecting some of the cutting lines CT11 and CT21. In the present embodiment, the boundary line BL-1 may have a diagonal shape that extends along at least portions of some of the second cutting lines CT21 defined in the third sub-mesh patterns 30-1.

However, embodiments of the present disclosure are not limited thereto. In certain embodiments, the boundary line BL-1 may be formed along at least portions of some of the first cutting lines CT11 or may be formed to have a line shape that connects portions of the first cutting lines CT11 and portions of the second cutting lines CT21. In addition, the boundary line BL-1 having the diagonal shape is illustrated in the present embodiment for the purpose of ease and convenience in description and illumination. However, embodiments of the present disclosure are not limited thereto. In certain embodiments, the boundary line BL-1 may have another shape such as a zigzag shape.

A plurality of cutting portions formed by remaining cutting lines may be defined in the first and second sensing patterns SP1-2 and SP2-2. Thus, the electronic device with improved visibility may be manufactured.

Figure 10A:
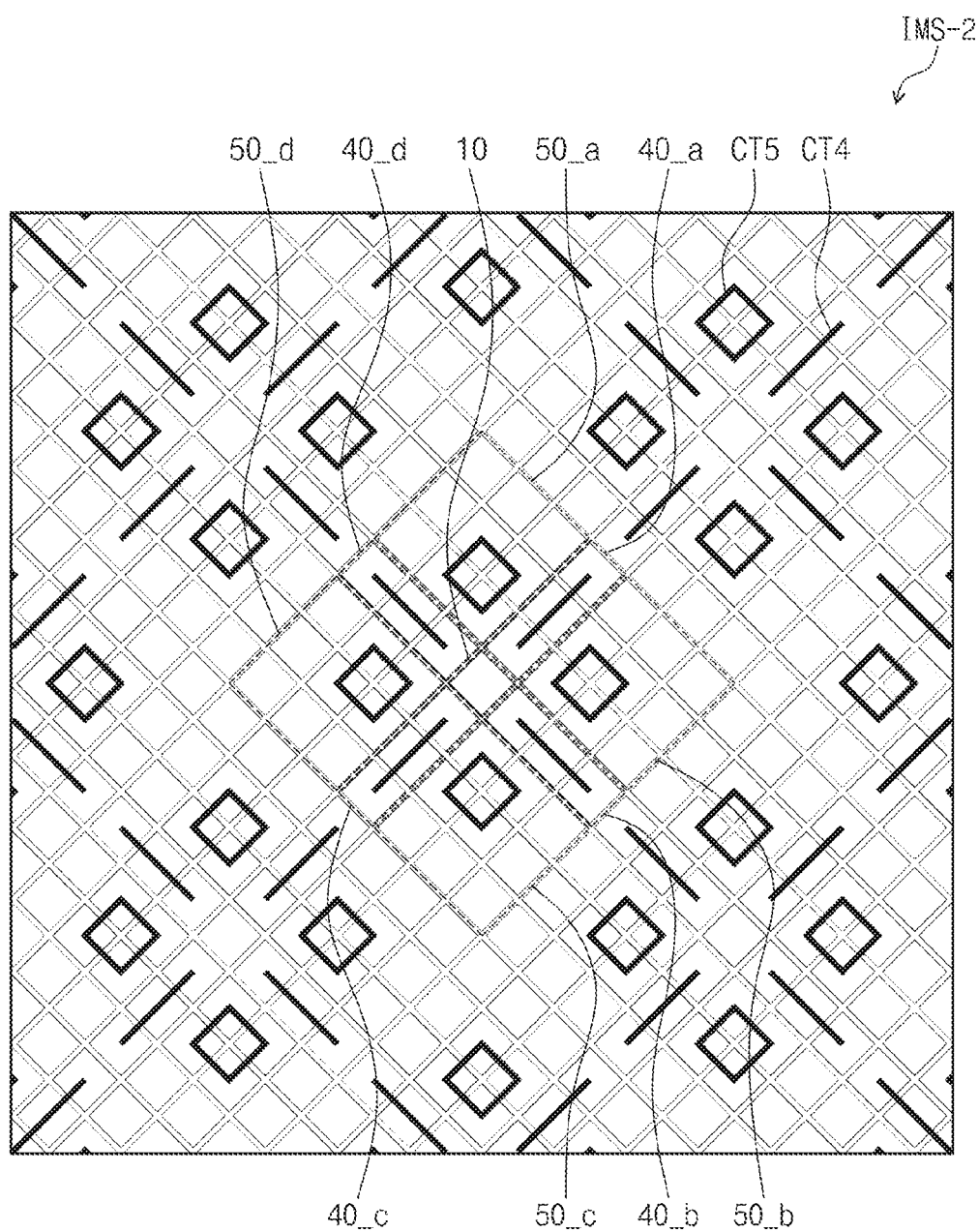
FIGS. 10A, 10B and 10C are plan views illustrating a method of manufacturing an electronic device, according to an embodiment of the present disclosure.
Figure 10B:
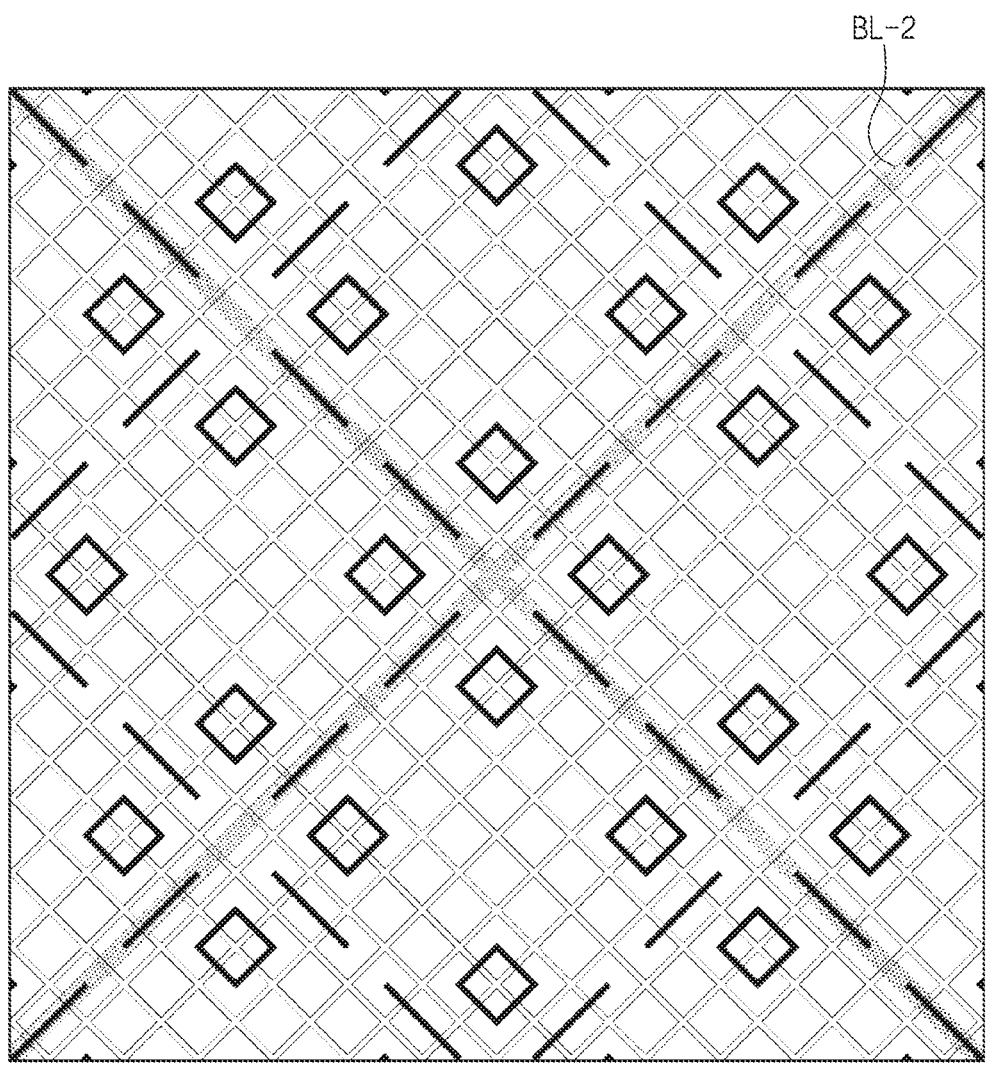
Figure 10C:
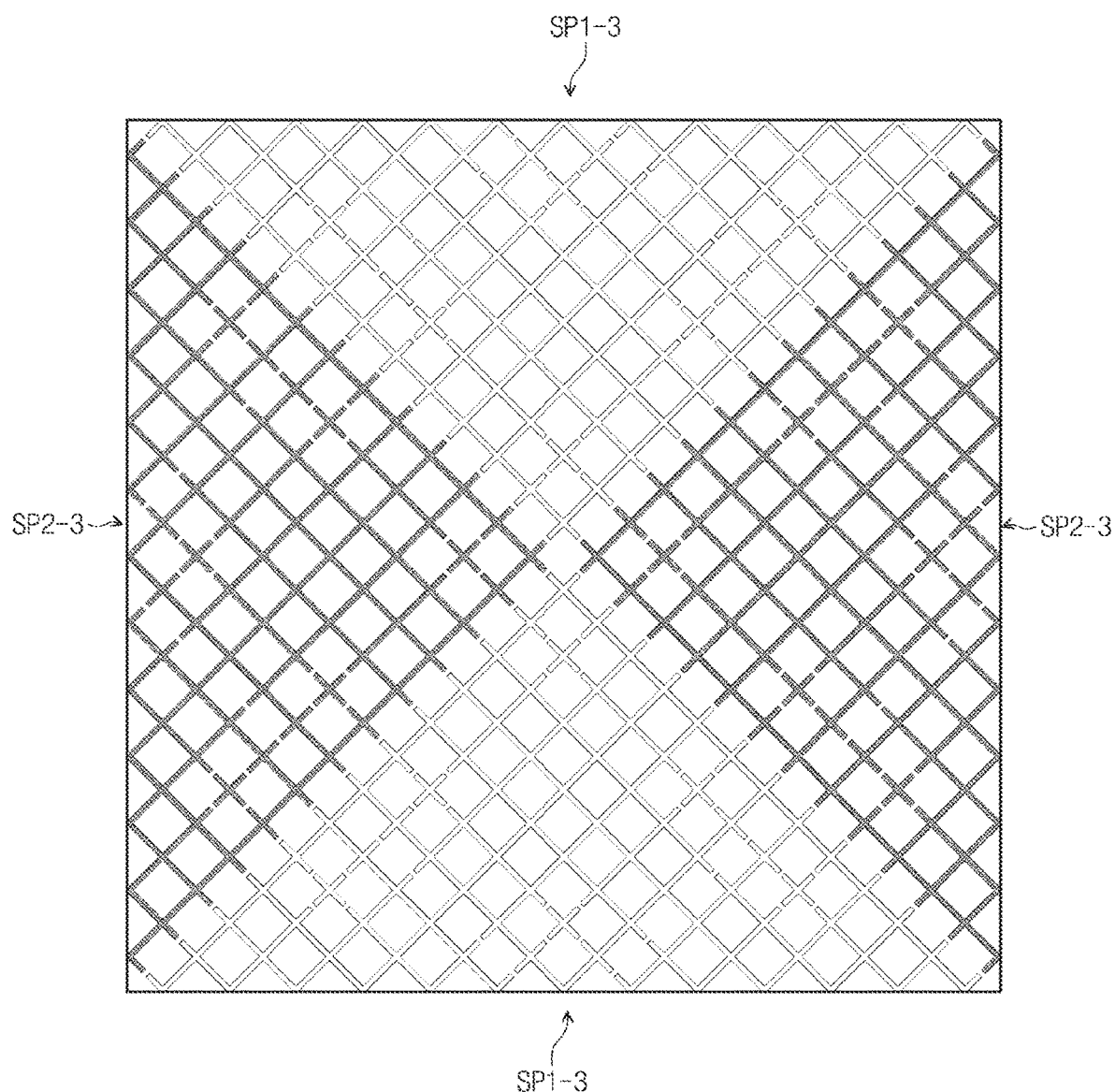

FIGS. 10A to 10C are plan views illustrating a method of manufacturing an electronic device, according to an embodiment of the present disclosure. FIGS. 10A to 10C illustrate substantially the same area. In FIGS. 10A and 10B, cutting lines are represented by dark lines to distinguish the cutting lines from mesh lines. In addition, in FIG. 10C, some of the mesh lines are shaded to distinguish the sensing patterns from each other.

FIGS. 10A and 10B illustrate a partial area of an initial mesh substrate IMS-2, and FIG. 10C illustrates a partial area of an electronic device. Hereinafter, a method of manufacturing an electronic device according to an embodiment of the present disclosure will be described with reference to FIGS. 10A to 10C. In addition, the same elements as described with reference to FIGS. 1 to 9C will indicated by the same reference numerals or designators, and the descriptions thereof will be omitted or mentioned briefly for the purpose of ease and convenience in description and illumination.

As illustrated in FIG. 10A, the initial mesh substrate IMS-2 is provided. The initial mesh substrate IMS-2 may include a plurality of unit mesh patterns repeatedly and continuously arranged. Each of the unit mesh patterns may include a first sub-mesh pattern 10, a plurality of fourth sub-mesh patterns 40_a, 40_b, 40_c, and 40_d, and a plurality of fifth sub-mesh patterns 50_a, 50_b, 50_c, and 50_d. The first sub-mesh pattern 10 may be substantially the same as the first sub-mesh pattern 10 illustrated in FIG. 5B, and thus the descriptions thereof are omitted.

The fourth sub-mesh patterns 40_a, 40_b, 40_c, and 40_d and the fifth sub-mesh patterns 50_a, 50_b, 50_c, and 50_d may be arranged to surround the edge of the first sub-mesh pattern 10. The fourth sub-mesh patterns 40_a, 40_b, 40_c, and 40_d are disposed adjacent to four sides of the first sub-mesh pattern 10 extending from the first-sub-mesh pattern 10 outwardly, respectively.

Each of the fourth sub-mesh patterns 40_a, 40_b, 40_c, and 40_d may include three peripheral openings. A fourth cutting line CT4 is defined in each of the fourth sub-mesh patterns 40_a, 40_b, 40_c, and 40_d.

The fourth cutting line CT4 may be a straight line that links centers of the three peripheral openings. The fourth cutting line CT4 opens the three peripheral openings. The fourth cutting line CT4 may extend in a direction perpendicular to one, adjacent thereto, of the fourth sides of the first sub-mesh pattern 10.

The fifth sub-mesh patterns 50_a, 50_b, 50_c, and 50_d are disposed adjacent to four vertexes of the first sub-mesh pattern 10 having a diamond shape, respectively. Each of the fifth sub-mesh patterns 50_a, 50_b, 50_c, and 50_d may have a diamond shape, and one vertex of each of the fifth sub-mesh patterns 50_a, 50_b, 50_c, and 50_d may be connected to each of the vertexes of the first sub-mesh pattern 10. Thus, the fourth sub-mesh patterns 40_a, 40_b, 40_c, and 40_d and the fifth sub-mesh patterns 50_a, 50_b, 50_c, and 50_d may be alternately arranged around the first sub-mesh pattern 10.

The number of peripheral openings included in each of the fifth sub-mesh patterns 50_a, 50_b, 50_c, and 50_d may be changed depending on the number of the peripheral openings included in each of the fourth sub-mesh patterns 40_a, 40_b, 40_c, and 40_d. When each of the fourth sub-mesh patterns 40_a, 40_b, 40_c, and 40_d includes N peripheral openings (where 'N' is a natural number), each of the fifth sub-mesh patterns 50_a, 50_b, 50_c, and 50_d may include N×N peripheral openings that are arranged in an N×N matrix form.

In the present embodiment, each of the fifth sub-mesh patterns 50_a, 50_b, 50_c, and 50_d may include nine peripheral openings arranged in a 3×3 matrix form. A fifth cutting line CT5 is defined in each of the fifth sub-mesh patterns 50_a, 50_b, 50_c, and 50_d.

The fifth cutting line CT5 may have a closed-loop shape that links centers of the peripheral openings. In the present embodiment, the fifth cutting line CT5 opens four peripheral openings. Each of the peripheral openings overlapping with the fifth cutting line CT5 may be opened to two peripheral openings adjacent thereto.

The fifth cutting line CT5 may be disposed at one of various positions in each of the fifth sub-mesh patterns 50_a, 50_b, 50_c, and 50_d. In the present embodiment, the fifth cutting line CT5 may be disposed adjacent to the first sub-mesh pattern 10. Alternatively, the fifth cutting line CT5 may be disposed away from the first sub-mesh pattern 10. However, embodiments of the present disclosure are not limited to a specific example.

Thereafter, as illustrated in FIGS. 10B and 10C, a boundary line BL-2 may be formed on the initial mesh substrate IMS-2 to form a plurality of first sensing patterns SP1-3 and a plurality of second sensing patterns SP2-3. As described above, the boundary line BL-2 may be formed by connecting some of the cutting lines CT4 and CT5. In the present embodiment, the boundary line BL-2 may have a diagonal shape that extends along some of the fourth cutting lines CT4.

However, embodiments of the present disclosure are not limited thereto. In certain embodiments, the boundary line BL-2 may be formed along portions of the fifth cutting lines CT5 or may be formed to have a line shape that connects portions of the fourth cutting lines CT4 and portions of the fifth cutting lines CT5. In addition, the boundary line BL-2 having the diagonal shape is illustrated in the present embodiment for the purpose of ease and convenience in description and illumination. However, embodiments of the present disclosure are not limited thereto. In certain embodiments, the boundary line BL-2 may have another shape such as a zigzag shape.

A plurality of cutting portions formed by remaining cutting lines may be defined in the first and second sensing patterns SP1-3 and SP2-3. Thus, the electronic device with improved visibility may be manufactured.

Figure 11A:
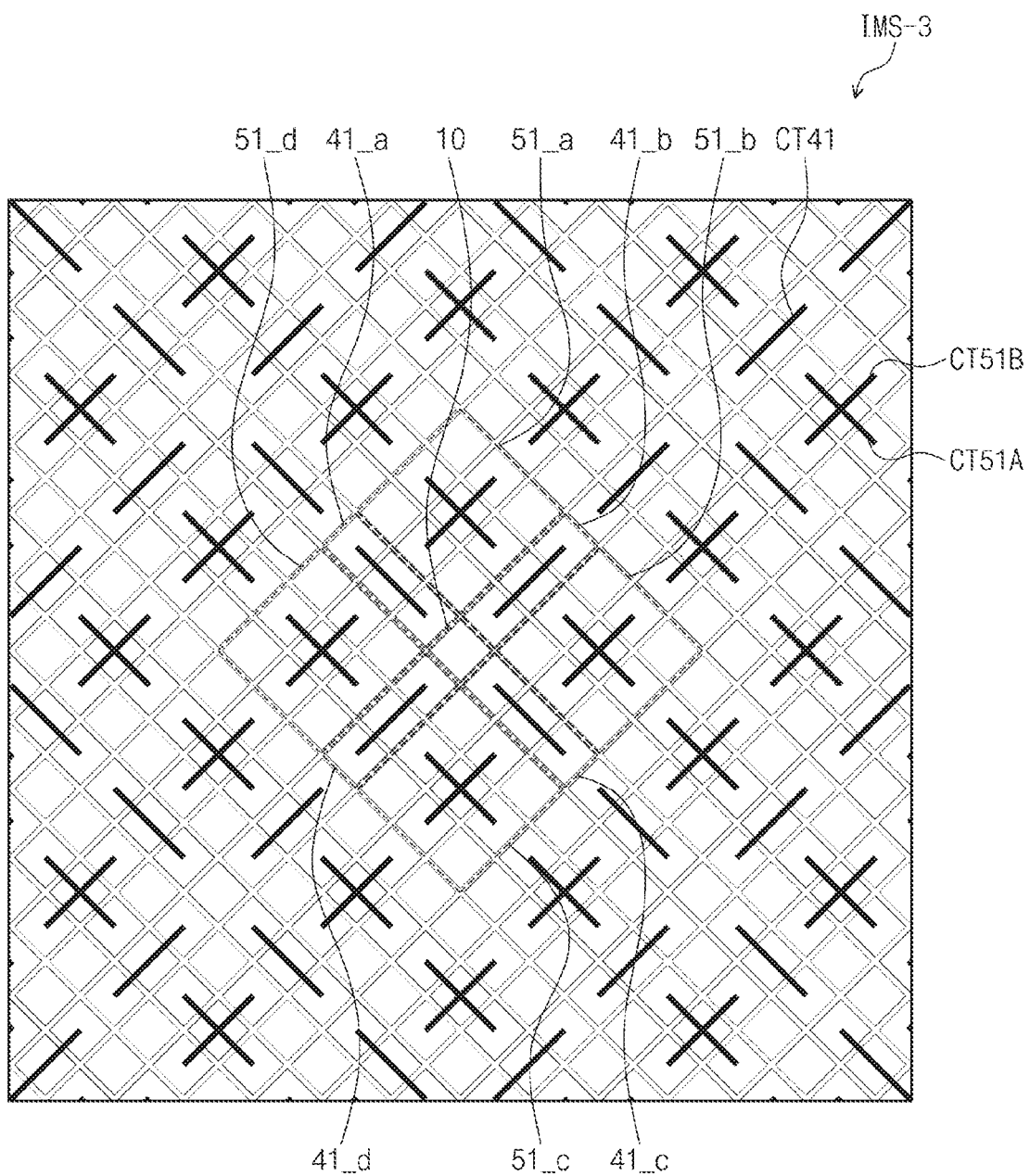
FIGS. 11A, 11B and 11C are plan views illustrating a method of manufacturing an electronic device, according to an embodiment of the present disclosure.
Figure 11B:
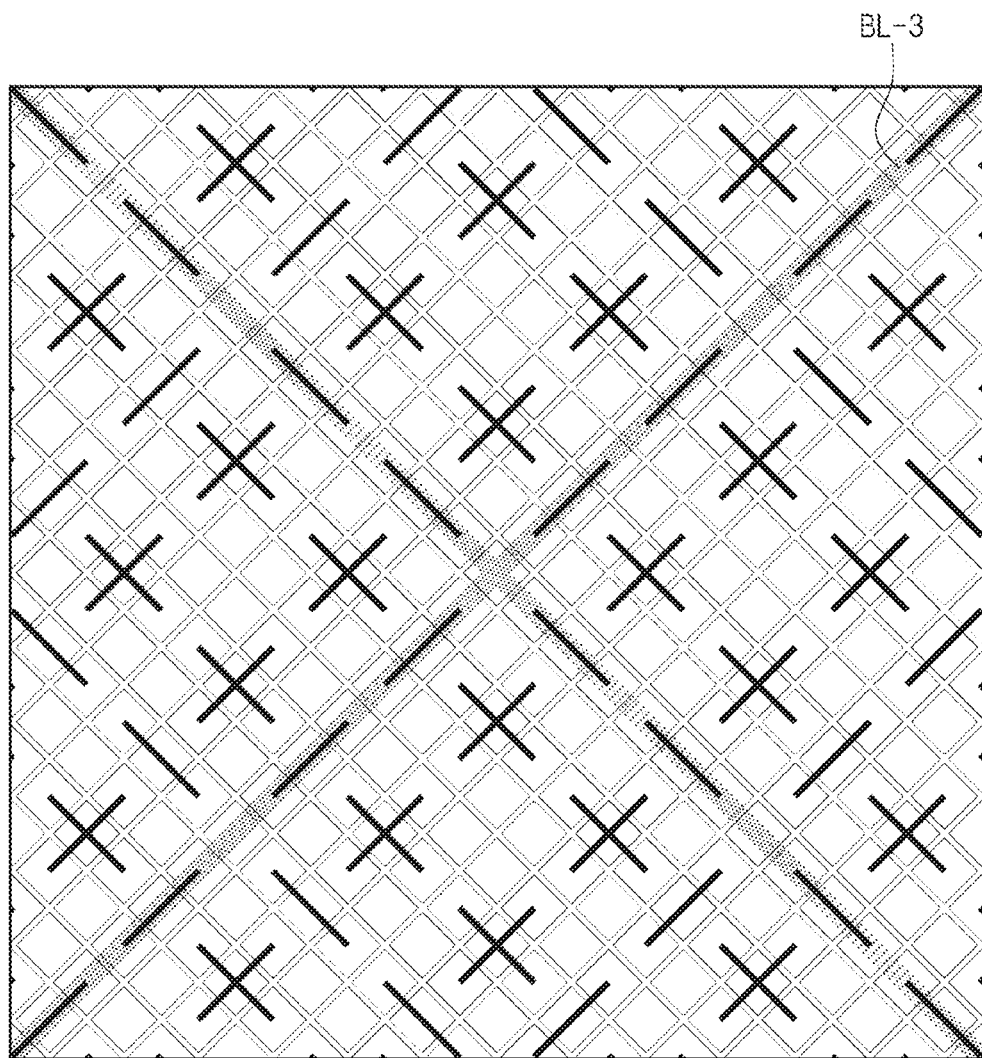
Figure 11C:
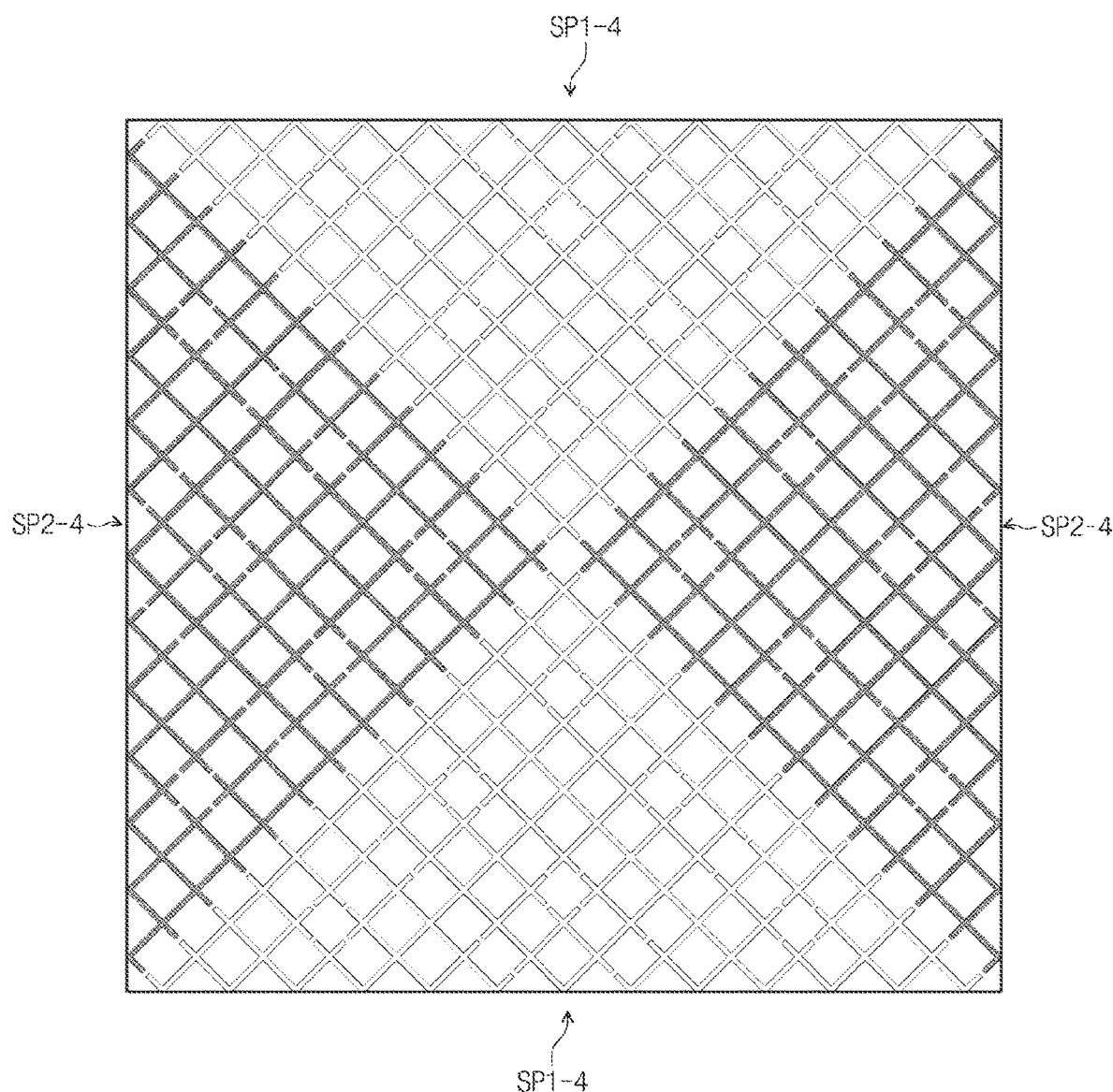

FIGS. 11A to 11C are plan views illustrating a method of manufacturing an electronic device, according to an embodiment of the present disclosure. FIGS. 11A to 11C illustrate substantially the same area. In FIGS. 11A and 11B, cutting lines are represented by dark lines to distinguish the cutting lines from mesh lines. In addition, in FIG. 11C, some of the mesh lines are shaded to distinguish the sensing patterns from each other.

FIGS. 11A and 11B illustrate a partial area of an initial mesh substrate IMS-3, and FIG. 11C illustrates a partial area of an electronic device. Hereinafter, a method of manufacturing an electronic device according to an embodiment of the present disclosure will be described with reference to FIGS. 11A to 11C. In addition, the same elements as described with reference to FIGS. 1 to 10C will indicated by the same reference numerals or designators, and the descriptions thereof will be omitted or mentioned briefly for the purpose of ease and convenience in description and illumination.

As illustrated in FIG. 11A, the initial mesh substrate IMS-3 is provided. The initial mesh substrate IMS-3 may include a plurality of unit mesh patterns repeatedly and continuously arranged. Each of the unit mesh patterns may include a first sub-mesh pattern 10, a plurality of fourth sub-mesh patterns 41_a, 41_b, 41_c, and 41_d, and a plurality of fifth sub-mesh patterns 51_a, 51_b, 51_c, and 51_d. The first sub-mesh pattern 10 may be substantially the same as the first sub-mesh pattern 10 illustrated in FIG. 5B, and thus the descriptions thereof are omitted.

The fourth sub-mesh patterns 41_a, 41_b, 41_c, and 41_d and the fifth sub-mesh patterns 51_a, 51_b, 51_c, and 51_d may be arranged to surround the edge of the first sub-mesh pattern 10. The fourth sub-mesh patterns 41_a, 41_b, 41_c, and 41_d are disposed adjacent to four sides of the first sub-mesh pattern 10 extending from the first sub-mesh pattern 10 outwardly, respectively.

The fourth sub-mesh patterns 41_a, 41_b, 41_c, and 41_d may substantially correspond to or may be the same as the fourth sub-mesh patterns 40_a, 40_b, 40_c, and 40_d illustrated in FIG. 10A, respectively. Fourth cutting lines CT41 defined in the fourth sub-mesh patterns 41_a, 41_b, 41_c, and 41_d may substantially correspond to or may be the same as the fourth cutting lines CT4 illustrated in FIG. 10A. Thus, detailed descriptions thereof are omitted.

The fifth sub-mesh patterns 51_a, 51_b, 51_c, and 51_d are disposed adjacent to four vertexes of the first sub-mesh pattern 10 having a diamond shape, respectively. Shapes and arrangement of the fifth sub-mesh patterns 51_a, 51_b, 51_c, and 51_d may substantially correspond to or may be the same as those of the fifth sub-mesh patterns 50_a, 50_b, 50_c, and 50_d illustrated in FIG. 10A. Thus, detailed descriptions thereof are omitted.

A sixth cutting line CT51A and a seventh cutting line CT51B may be disposed in each of the fifth sub-mesh patterns 51_a, 51_b, 51_c, and 51_d. The sixth cutting line CT51A and the seventh cutting line CT51B may have straight line shapes having an equal length and may intersect each other. Thus, the sixth cutting line CT51A and the seventh cutting line CT51B may constitute an X-shaped pattern.

Each of the sixth and seventh cutting lines CT51A and CT51B has the same length and shape as the fourth cutting line CT41. Thus, each of the sixth and seventh cutting lines CT51A and CT51B opens three peripheral openings. In the present embodiment, the sixth and seventh cutting lines CT51A and CT51B are disposed to open five peripheral openings in each of the fifth sub-mesh patterns 51_a to 51_d, and one of the five peripheral openings may be connected or opened to four peripheral openings adjacent thereto.

However, these are illustrated as an example, and embodiments of the present disclosure are not limited thereto. In certain embodiments, the shapes and arrangement of the sixth and seventh cutting lines CT51A and CT51B may be variously modified, and thus the peripheral openings of each of the fifth sub-mesh patterns 51_a to 51_d may be connected or opened to adjacent peripheral openings in various forms.

Thereafter, as illustrated in FIGS. 11B and 11C, a boundary line BL-3 may be formed on the initial mesh substrate IMS-3 to form a plurality of first sensing patterns SP1-4 and a plurality of second sensing patterns SP2-4. As described above, the boundary line BL-3 may be formed by connecting some of the cutting lines CT41, CT51A, and CT51B. In the present embodiment, the boundary line BL-3 may have a diagonal shape that extends along some of the fourth cutting lines CT41.

However, embodiments of the present disclosure are not limited thereto. In certain embodiments, the boundary line BL-3 may be formed along portions of the sixth cutting lines CT51A or the seventh cutting lines CT51B or may be formed to have a line shape that connects portions of the fourth cutting lines CT41 and portions of the sixth cutting lines CT51A or the seventh cutting lines CT51B. In addition, the boundary line BL-3 having the diagonal shape is illustrated in the present embodiment for the purpose of ease and convenience in description and illumination. However, embodiments of the present disclosure are not limited thereto. In certain embodiments, the boundary line BL-3 may have another shape such as a zigzag shape.

A plurality of cutting portions formed by remaining cutting lines may be defined in the first and second sensing patterns SP1-4 and SP2-4. Thus, the electronic device with improved visibility may be manufactured.

According to embodiments of the present disclosure, various-shaped sensing patterns may be formed through an initial mesh substrate in which the cutting lines variously arranged and corresponding to extending directions of the mesh lines are defined.

In addition, since the optical compensation patterns are formed, it is difficult to distinguish sensors from each other. Thus, the visibility of the electronic device may be improved.

Furthermore, according to the manufacturing method according to the present disclosure, the sensor having the optical compensation pattern may be formed by only the process of forming the boundary line, and thus manufacturing processes may be simplified, and a process cost may be reduced.

While the present disclosure has been described with reference to example embodiments, it will be apparent to those skilled in the art that various changes and modifications may be made without departing from the spirits and scopes of the present disclosure. Therefore, it should be understood that the above embodiments are not limiting, but illustrative. Thus, the scopes of the present disclosure are to be determined by the broadest permissible interpretation of the following claims and their equivalents, and shall not be restricted or limited by the foregoing description.

What is claimed is:

1. An electronic device comprising:
a display member comprising a plurality of display elements, the display member divided into light emitting areas in which the display elements are respectively disposed and a non-light emitting area adjacent to the light emitting areas when viewed from a plan view; and
a sensing member comprising: a first sensing pattern disposed on the display member; and a second sensing pattern disposed on the display member and capacitively coupled to the first sensing pattern,
wherein each of the first and second sensing patterns comprises a plurality of mesh lines that define a plurality of openings overlapping with the light emitting areas, respectively,
wherein each of the first and second sensing patterns comprises a unit mesh pattern comprising: a central opening; and a plurality of peripheral openings surrounding the central opening,
wherein the central opening and the peripheral openings are included in the plurality of openings,
wherein a plurality of cutting lines, each of which opens at least two adjacent openings of the plurality of peripheral openings to each other, are defined in the unit mesh pattern, and
wherein the cutting lines are imaginary lines corresponding to cut portions of the plurality of mesh lines, and the cutting lines are arranged in a direction surrounding the central opening.

2. The electronic device of claim 1, wherein each of the cutting lines is defined to connect centers of some of the peripheral openings, and
wherein portions of the mesh lines that overlap with the cutting lines are cut to open the peripheral openings.

3. The electronic device of claim 1, wherein the peripheral openings are arranged to surround the central opening in the unit mesh pattern, and
wherein the unit mesh pattern has a shape corresponding to a shape of the peripheral openings connected to each other.

4. The electronic device of claim 1, wherein the unit mesh pattern comprises:
a central mesh pattern in which the central opening is defined, the central mesh pattern having a quadrilateral shape; and
a sub-mesh pattern in which the peripheral openings are defined, the sub-mesh pattern having a frame shape surrounding the central mesh pattern,
wherein the cutting lines are spaced apart from each other in the sub-mesh pattern and are arranged in a clockwise direction or counterclockwise direction around the central mesh pattern.

5. The electronic device of claim 4, wherein the sub-mesh pattern comprises:
first sub-mesh patterns that are respectively adjacent to four sides of the central mesh pattern, wherein first cutting lines are defined in the first sub-mesh patterns; and
second sub-mesh patterns that are respectively adjacent to four vertexes of the central mesh pattern, wherein second cutting lines are defined in the second sub-mesh patterns,
wherein i peripheral openings are defined in each of the first sub-mesh patterns where 'i' is a natural number, and
wherein i×i peripheral openings are defined in each of the second sub-mesh patterns.

6. The electronic device of claim 5, wherein each of the first cutting lines has a line shape that extends in a direction intersecting adjacent one of the four sides of the central mesh pattern.

7. The electronic device of claim 5, wherein each of the second cutting lines has a closed-loop shape.

8. The electronic device of claim 5, wherein each of the second cutting lines has an X-shape.

9. The electronic device of claim 4, wherein the sub-mesh pattern comprises:
a first sub-mesh pattern that has a quadrilateral frame shape surrounding an edge of the central mesh pattern, wherein first cutting lines are defined in the first sub-mesh pattern; and
a second sub-mesh pattern that has a quadrilateral frame shape surrounding the first sub-mesh pattern, wherein second cutting lines are defined in the second sub-mesh pattern,
wherein each of the first cutting lines has a straight line shape, and
wherein each of the first cutting lines extends in parallel to adjacent one of four sides of the central mesh pattern.

10. The electronic device of claim 9, wherein the second cutting lines have the same shapes as the first cutting lines, and
wherein each of the second cutting lines extends in parallel to adjacent one of four sides of the first sub-mesh pattern.

11. The electronic device of claim 9, wherein each of the second cutting lines has a bent line shape, and
wherein the second cutting lines are respectively adjacent to four vertexes of the first sub-mesh pattern and are arranged to surround the four vertexes.

12. The electronic device of claim 1, wherein a plurality of unit mesh patterns are arranged, and outermost mesh lines of adjacent unit mesh patterns overlap with each other.

13. The electronic device of claim 1, wherein a plurality of unit mesh patterns are arranged, and at least one of the cutting lines of one unit mesh pattern is connected to a corresponding one of the cutting lines of another unit mesh pattern that is adjacent to the one unit mesh pattern.

14. An electronic device comprising:
a display member comprising a plurality of display elements, the display member divided into light emitting areas in which the display elements are respectively disposed and a non-light emitting area adjacent to the light emitting areas when viewed from a plan view; and
a sensing member comprising: a first sensing pattern disposed on the display member; and a second sensing pattern disposed on the display member and capacitively coupled to the first sensing pattern,
wherein each of the first and second sensing patterns comprises a plurality of mesh lines that define a plurality of openings overlapping with the light emitting areas, respectively,
wherein each of the first and second sensing patterns comprises a unit mesh pattern comprising: a central opening; and a plurality of peripheral openings surrounding the central opening,
wherein the central opening and the peripheral openings are included in the plurality of openings,
wherein a plurality of cutting portions are defined in the unit mesh pattern, and each of the plurality of cutting portions cuts a corresponding one of the plurality of mesh lines and opens at least two adjacent openings of the plurality of peripheral openings to each other, and
wherein the cutting portions are arranged in a direction surrounding the central opening.

15. The electronic device of claim 14, wherein the plurality of mesh lines overlap with the non-light emitting area.

\* \* \* \* \*